United States Patent
Fujita et al.

(10) Patent No.: US 11,016,473 B2
(45) Date of Patent: May 25, 2021

(54) PROCESS CONTROL SYSTEM AND DATA PROCESSING METHOD

(71) Applicant: YOKOGAWA ELECTRIC CORPORATION, Tokyo (JP)

(72) Inventors: Sho Fujita, Tokyo (JP); Kimikazu Takahashi, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 96 days.

(21) Appl. No.: 15/964,926

(22) Filed: Apr. 27, 2018

(65) Prior Publication Data
US 2018/0314243 A1    Nov. 1, 2018

(30) Foreign Application Priority Data
Apr. 28, 2017  (JP) .............................. JP2017-089880

(51) Int. Cl.
G05B 19/418    (2006.01)

(52) U.S. Cl.
CPC ..... *G05B 19/41885* (2013.01); *G05B 19/418* (2013.01); *G05B 2219/32337* (2013.01)

(58) Field of Classification Search
None
See application file for complete search history.

(56) References Cited

U.S. PATENT DOCUMENTS

| | | | |
|---|---|---|---|
| 2010/0299119 A1* | 11/2010 | Erikson | G05B 19/4184 703/6 |
| 2012/0131373 A1* | 5/2012 | Rohle | G05B 19/0423 713/400 |
| 2013/0325158 A1* | 12/2013 | Kobayashi | G05B 19/41875 700/108 |
| 2014/0149060 A1* | 5/2014 | Meduna | G06F 1/3206 702/94 |
| 2014/0215167 A1 | 7/2014 | Ochiai | |
| 2015/0120972 A1 | 4/2015 | Tanimura et al. | |
| 2015/0235544 A1* | 8/2015 | Hernandez | E21B 7/00 340/853.1 |
| 2016/0140009 A1 | 5/2016 | Watanabe et al. | |

(Continued)

FOREIGN PATENT DOCUMENTS

| | | |
|---|---|---|
| JP | H06137164 A | 5/1994 |
| JP | 2013054497 A | 3/2013 |

(Continued)

OTHER PUBLICATIONS

Lei Guo, Self-convergence of Weighted Least-Squares with Applications to Stochastic Adaptive Control, Jan. 1996, IEEE Transactions On Automatic Control, vol. 41, No. 1, pp. 79-89 (Year: 1996).*

*Primary Examiner* — Kenneth M Lo
*Assistant Examiner* — Istiaque Ahmed
(74) *Attorney, Agent, or Firm* — Osha Bergman Watanabe & Burton LLP

(57) ABSTRACT

A process control system includes: one or a plurality of field devices configured to be placed in a plant; and a control apparatus configured to perform at least one of input and output on the field device to control the plant; and a change trend calculation device configured to calculate a change trend in time-series data including an observed value at each point in time of the field device.

12 Claims, 10 Drawing Sheets

(56) References Cited

U.S. PATENT DOCUMENTS

| | | | |
|---|---|---|---|
| 2017/0074589 A1 | 3/2017 | Somary et al. | |
| 2018/0003572 A1* | 1/2018 | Garsd | G01K 13/00 |
| 2019/0073609 A1* | 3/2019 | Hollender | G05B 19/41885 |

FOREIGN PATENT DOCUMENTS

| | | |
|---|---|---|
| JP | 2014-167706 A | 9/2014 |
| JP | 5868784 B2 | 2/2016 |
| JP | 5904190 B2 | 4/2016 |
| JP | 2016095751 A | 5/2016 |

* cited by examiner

FIG. 10A

| CHANNEL | SLOPE | STATUS |
|---|---|---|
| 42-1 | 0.01 | → |
| 42-2 | -0.02 | → |
| 42-3 | 0.00 | → |
| ... | ... | ... |
| 42-N | 0.98 | ↗ |

FIG. 10B

| CHANNEL | PATTERN A | PATTERN B | ... | PATTERN M |
|---|---|---|---|---|
| 42-1 | ↗ | → | ... | → |
| 42-2 | ↗ | ↘ | ... | → |
| 42-3 | → | ↗ | ... | → |
| ... | ... | ... | ... | ... |
| 42-N | → | → | ... | → |
| DISPLAY DATA | TEMPERATURE 1 | FLOW RATE 1 | ... | PRESSURE 5 |
| PRIORITY LEVEL | H | M | ... | L |

PROCESS CONTROL SYSTEM AND DATA PROCESSING METHOD

CROSS-REFERENCE TO RELATED APPLICATION

This application claims priority from Japanese Patent Application No. 2017-089880 filed with the Japan Patent Office on Apr. 28, 2017, the entire content of which is hereby incorporated by reference.

BACKGROUND

1. Technical Field

The present invention relates to a process control system and a data processing method.

2. Description of the Related Art

An operation monitoring terminal is conventionally provided in a process control system in some cases to manipulate the operation of a process being a control target. The use of this terminal allows an operator being a user to freely select some of various pieces of time-series data indicating, for example, state quantities of the process measured by field devices and the like. For example, a process monitoring system described in Japanese Patent No. 5868784 judges the state of a plant, on the basis of time-series data outputted from field devices that measure state quantities in an industrial process, and change trends in the state quantities. As a result of the judgment, the obtained state and state quantities are displayed. Moreover, a monitoring apparatus described in JP-A-2014-167706 outputs a trend graph on the basis of a physical quantity measured by a sensor. In this graph, time-series data of the physical quantity including a future predicted value of the physical quantity is presented in graphical form. An operator interprets a change trend in time-series data selected by a display device of an operation monitoring terminal to, for example, find an abnormality and predict a future value.

Moreover, advances have recently been made in putting intelligence in field devices. For example, some of the field devices have a function of detecting an environment state where the field device is installed, a setting state of the field device, and the like, and a function of notifying another device of information on the detected state. Such states include, for example, an ambient temperature, a measurement range setting abnormality, clogging of a connecting pipe, and valve operation summation information. Moreover, a device being a notification destination is, for example, a device management terminal. Maintenance personnel being a user may check a change in time-series data indicating the notified state, and determine whether or not it is necessary to carry out maintenance work before a trouble occurs.

SUMMARY

A process control system according to one or more embodiments of the present invention includes: one or a plurality of field devices configured to be placed in a plant; and a control apparatus configured to perform at least one of input and output on the field device to control the plant; and a change trend calculation device configured to calculate a change trend in time-series data including an observed value at each point in time of the field device.

BRIEF DESCRIPTION OF THE DRAWINGS

FIGS. 10A and 10B are diagrams illustrating examples of patterns of change trends in the observed values according to one or more embodiments of the present invention;

DETAILED DESCRIPTION OF EMBODIMENTS

Figure 1:
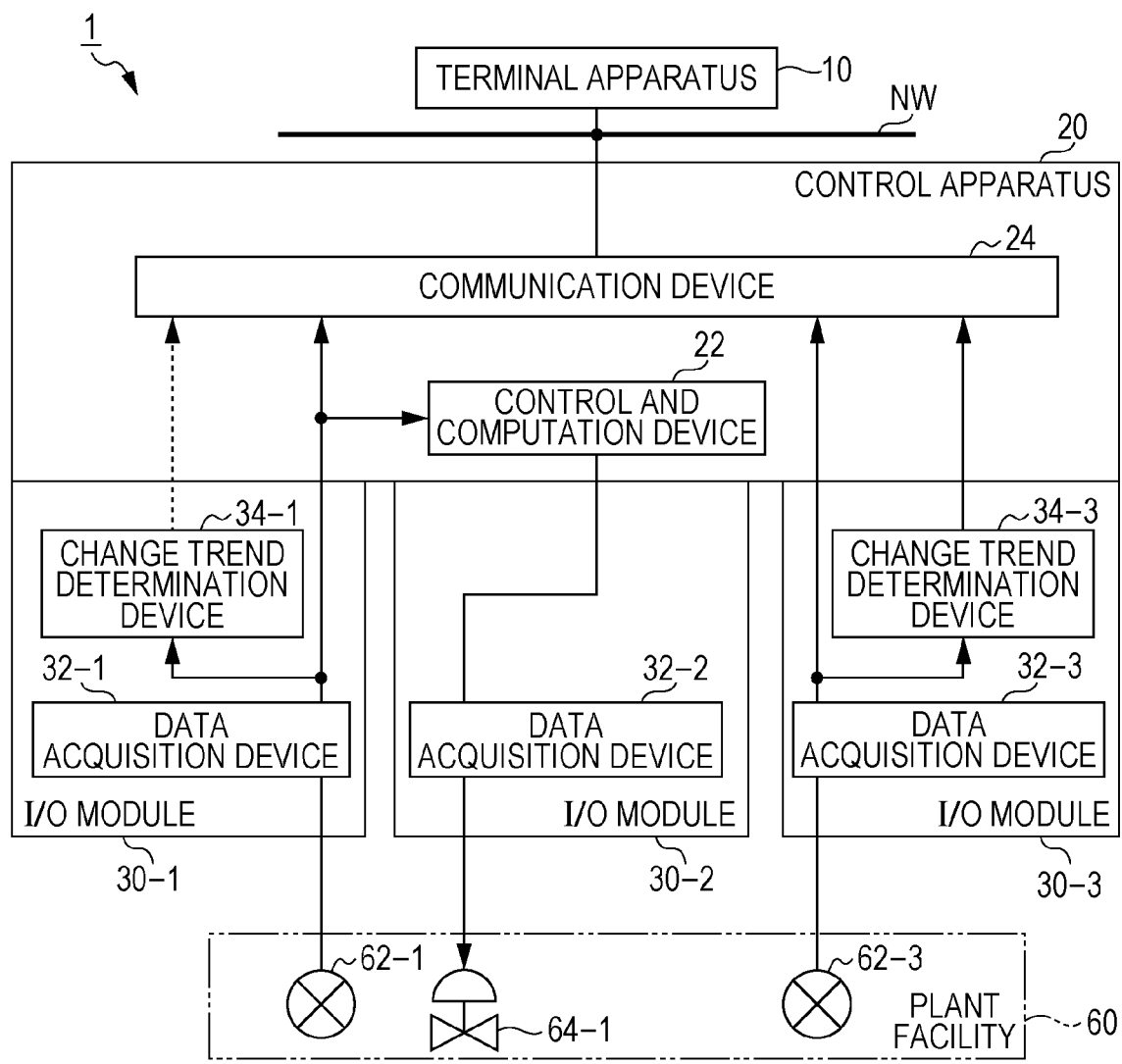
FIG. 1 is a block diagram illustrating an example of the configuration of a control system according to one or more embodiments of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Time-series data indicating observables such as a state value indicating the state of a process and a device state quantity indicating the state of a field device is normally displayed on a display device of an operation monitoring terminal or the like. An operator and maintenance personnel interpret the displayed time-series data on the basis of their own experience and knowledge, and predict their future values. Therefore, the operator and the maintenance personnel are required to be highly competent. Hence, the operating load including the operation and the maintenance personnel is heavy.

Moreover, one operator generally needs to manipulate and monitor a plurality of pieces of time-series data. The number of time series to be manipulated and monitored is several tens for a small-scale plant, and may run into several thousands for a large-scale plant. A heavy load is placed to interpret each piece of the time-series data and predict its future value. Hence, it is not, in effect, possible to monitor only a part of points to be manipulated and monitored. Moreover, it is expected that intelligent field devices that can detect and output their states autonomously become further widespread in the future. However, if the number of monitoring targets for each of maintenance personnel is too high, information acquired from the field devices may not be able to be used fully.

Furthermore, in order to support the work of the operator and the maintenance personnel, an output value for a state quantity acquired by using a simulator's prediction function may be calculated to be displayed on a display device as a predicted trend in future state quantities of time-series data up to the current point in time. However, if an engineer does not have a wide range of knowledge about the physical properties of a material handled in a plant, the outside environment, and the like, it is not possible to handle the generation of a model for a simulation. Moreover, the generation of a model for a simulation requires still more amount of work (for example, approximately several persons per month). Hence, it is becoming difficult to construct a model for all monitoring points, the number of which is increasing.

A process control system and a data processing method according to one or more embodiments of the present invention are made considering the above points. In other words, the process control system and the data processing method according to one or more embodiments of the present invention appropriately grasp change trends in observed values when users such as operators and maintenance personnel of the process control system observe many pieces of time-series data.

(1) A process control system according to one or more embodiments of the present invention includes: one or a plurality of field devices configured to be placed in a plant; and a control apparatus configured to perform at least one of input and output on the field device to control the plant; and a change trend calculation device configured to calculate a change trend in time-series data including an observed value at each point in time of the field device.

(2) In the above-mentioned process control system, the change trend calculation device connects the field device and the control apparatus, and is provided to at least an input device into which an output from the field device is inputted.

(3) In the above-mentioned process control system, the change trend calculation device is provided to the field device.

(4) In the above-mentioned process control system, the change trend calculation device is provided to a relay apparatus that relays an observed value to be transmitted from the field device to the control apparatus.

(5) In the above-mentioned process control system, the change trend calculation device extracts time-series data indicating an observed value at each point in time within an analysis range from a first point in time to a second point in time, and calculates a slope of a linear function indicating a change trend in the observed values within the analysis range in such a manner as to minimize an objective function, the objective function is the sum of multiplied values at the points in time within the analysis range, the multiplied value is a numerical value obtained by multiplying a square value of a difference between a function value of the linear function and the observed value by a weight coefficient, and the weight coefficient is a numerical value that becomes higher with increasing elapsed time from the first point in time to each point in time.

(6) In the above-mentioned process control system, the process control system includes a notification selection device configured to select a channel for notifying information on the channel on the basis of the change trend per channel.

(7) In the above-mentioned process control system, the notification selection device includes: a storage device configured to previously store a judgment table where a pattern indicating the change trend per channel is associated with a specific channel; and a notification output device configured to refer to the judgment table, select a pattern matching change trends in the observed values indicated by time-series data per channel, and select a specific channel associated with the pattern.

(8) In the above-mentioned process control system, the judgment table includes the pattern to which a priority level is assigned, and upon there being a plurality of patterns selected, the notification output device gives a higher priority to and outputs information on the specific channel associated with the pattern as the priority level assigned to the pattern is increased.

(9) In the above-mentioned process control system, the notification selection device calculates expected time from a current point in time to a point in time when an observed value of a channel exceeds a predetermined threshold on the basis of the change trend per channel, and selects a channel for notifying information on the channel on the basis of the expected time per channel.

(10) In the above-mentioned process control system, the process control system includes a management apparatus configured to display the time-series data or the change trend.

(11) A data processing method according to one or more embodiments of the present invention includes: placing one or a plurality of field devices in a plant; performing at least one of input and output on the field device to control the plant; and calculating a change trend in time-series data including an observed value at each point in time measured by at least one of the field devices.

According to one or more embodiments of the present invention, the load of interpretation of a change trend in observed values and prediction of future values on a user who observes time-series data is reduced. Hence, the change trend in observed values can be appropriately grasped. Moreover, more pieces of time-series data can in effect be monitored by the reduction of the load for each individual observed value.

A process control system and a data processing method according to one or more embodiments of the present invention are described hereinafter with reference to the drawings.

Firstly, an example of the configuration of a control system according to one or more embodiments of the present invention is described.

FIG. 1 is a block diagram illustrating an example of the configuration of a control system 1 according to one or more embodiments of the present invention.

The control system 1 according to one or more embodiments of the present invention is a process control system including a terminal apparatus 10, a control apparatus 20, and I/O modules 30. In an example illustrated in FIG. 1, the number of the I/O modules 30 is three. In the following description, when a group of the I/O modules is collectively referred to, and when it is not required to distinguish the group of the I/O modules, they are called the I/O module 30. When each individual I/O module is distinguished, a sub-number such as "-1" is assigned and referred to as, for example, the I/O module 30-1. Among the three I/O modules 30, the I/O modules 30-1 and 30-3 are electronic devices according to one or more embodiments of the present invention. A controlled system that is a control target of the control apparatus is a plant facility 60. The terminal apparatus 10 and the control apparatus 20 are connected to each other via a control network NW. Various pieces of data can be transmitted and received by wired or wireless connection between the terminal apparatus 10 and the control apparatus 20. The terminal apparatus 10 and the control apparatus 20 may configure a single integrated apparatus. Therefore, the control network NW may not necessarily be a constituent element of the control system 1. Moreover, each of the I/O modules 30-1 to 30-3 may be an independent device that is detachable from the control apparatus 20. Moreover, these I/O modules may be integral with the control apparatus 20 as a part of the control apparatus 20.

The terminal apparatus 10 sequentially receives time-series data and change trend data from the control apparatus 20 via the control network NW. The time-series data is data indicating an observed value at each point in time. The change trend data is data indicating a slope being the index of a temporal change trend in the observed value at each point in time. The terminal apparatus 10 generates a display graph illustrating the observed value at each point in time. The generated display graph is displayed by the terminal apparatus 10 on a display device (described below). The observed value change trend at the current point in time may be further displayed on the display graph.

The terminal apparatus 10 is configured as, for example, an operation monitoring terminal or device management terminal. The operation monitoring terminal is a device for mainly the operator controlling the operation of the control apparatus 20, and further the state of the plant facility 60 being a control target. The device management terminal is a device for mainly the maintenance personnel managing the operating states of the control apparatus 20, the I/O module 30, and a field device 62 themselves, and further the state of the plant facility 60. The terminal apparatus 10 may generate various pieces of instruction information on the basis of, for example, operation signals in accordance with operations accepted by an operation input device (described below). The instruction information includes, for example, information for manipulating the operating state of the control apparatus 20, such as the start and stop of control, and control parameters. The terminal apparatus 10 transmits the generated instruction information to the control apparatus 20. The terminal apparatus 10 may be configured as, for example, a personal computer, a workstation, a business-grade mobile terminal apparatus (a tablet), or a multi-function mobile phone.

Various pieces of time-series data are inputted from the I/O module 30 into the control apparatus 20. The time-series data to be inputted is transmitted by the control apparatus 20 to the terminal apparatus 10. Examples of observed values indicated by the time-series data to be inputted include an input value indicating the state of the plant facility 60 being the control target and a state quantity indicating the state of each individual field device 62 itself. Examples of the state quantities include diagnosis information obtained by a self-diagnostic function, such as the remaining power of a battery being a power source of the field device 62, an electromagnetic force of the battery, and an electric resistance value, a current value, and others indicating the deteriorated state of a component.

The control apparatus 20 may be configured as, for example, a PLC (programmable logic controller) in a DCS (distributed control system) and FA (factory automation).

The control apparatus 20 includes a control and computation device 22 and a communication device 24.

An input value indicating the state of the plant facility 60 is inputted from the I/O module 30 into the control and computation device 22 at predetermined time intervals. The input value corresponds to a controlled variable. A value instructed by the instruction information inputted from the terminal apparatus 10 may be used as a target value. Moreover, a value preset for the control and computation device 22 may be used. The control and computation device 22 performs predetermined control and a computation on the input value in such a manner as to reduce a deviation of an output value from the target value. In this manner, the control and computation device 22 sequentially calculates output values to be outputted to the plant facility 60 via the I/O module 30. The calculated output value corresponds to a manipulated variable. The control and computation is, for example, PI control and PID control. The control and computation device 22 outputs the calculated output value to the I/O module 30. The type of input value, the number of channels, the type of output value, and the number of channels can vary depending on the control and computation. In the example illustrated in FIG. 1, input values are inputted into the control and computation device 22, respectively from the I/O modules 30-1 and 30-3. Output values are outputted from the modules to the I/O module 30-2. The control and computation device 22 may transmit the time-series data taking an output value or deviation at each point in time as the observed value to the terminal apparatus 10 via the communication device 24.

The communication device 24 is communicably connected to the control network NW. The communication device 24 transmits and receives various pieces of data by wired or wireless connection to and from a device connected to the control network NW, for example, the terminal apparatus 10. The communication device 24 is, for example, a communication interface.

The I/O module 30 is electrically or communicably connected as an input/output apparatus to the control apparatus 20 and each field device 62 installed in the plant facility 60. The I/O module 30 relays various pieces of data between the control apparatus 20 and the field device 62. The I/O module 30 includes a data acquisition device 32 that acquires, from a device connected as an input source, time-series data indicating an observed value at each point in time. The data acquisition device 32 outputs the acquired time-series data to a device connected as an output destination. In the example illustrated in FIG. 1, the data acquisition devices 32-1 and 32-3 acquire input values inputted from the field devices 62-1 and 62-3, respectively. The acquired input values are outputted by the field devices to the control apparatus 20. The data acquisition device 32-2 acquires an output value inputted from the control apparatus 20. The acquired output value is outputted by the data acquisition device 32-2 to a field device 64-1.

The I/O module 30 further includes a change trend determination device 34. The change trend determination device 34 calculates a slope indicating a temporal change trend in the observed value at each point in time indicated by the time-series data inputted from the data acquisition device 32. The change trend determination device 34 outputs change trend data indicating the calculated slope to the control apparatus 20. In the example illustrated in FIG. 1, the change trend determination devices 34-1 and 34-3 calculate slopes of observed values indicated by the time-series data inputted from the data acquisition devices 32-1 and 32-3, respectively. The change trend determination devices 34-1 and 34-3 output, to the control apparatus 20, the change trend data indicating the calculated slopes. An example of the configuration of the change trend determination device 34 is described below. Not all the I/O modules 30 necessarily include the change trend determination device 34. In the I/O module 30-2 illustrated in FIG. 1, the change trend determination device 34 is omitted. The I/O module 30 including the change trend determination device 34 is simply required to function as an input device that acquires an input value from the field device 62. The I/O module 30 does not necessarily include the function of acquiring an output value from the control apparatus 20, or the function of outputting an output value to the field device 64.

The operating state of the plant facility 60 is controlled by an output value outputted from the control apparatus 20 via the I/O module 30. Moreover, an input value indicating the operating state of the plant facility 60 is inputted into the control apparatus 20 via the I/O module 30.

Various field devices 62 are installed in the plant facility 60. The field device 62 includes a sensor for detecting the operating state of the plant facility 60, and an actuator for manipulating the operating state of the plant facility 60.

The sensor detects a physical quantity indicating the state of the plant facility 60. Examples of the sensor include a temperature sensor that detects a temperature, a pressure sensor that detects a pressure, a flowmeter that detects a fluid, an ammeter that detects a current, and a voltmeter that detects a voltage.

The actuator operates in accordance with the output value. The state of the plant facility 60 changes in accordance with the operation. Examples of the actuator include a pump, a compressor, a valve, a motor, and a motor drive apparatus. As the output is increased, the operation amount of the actuator is generally increased. For example, the operation amount of the actuator is proportional to the output value. In the example illustrated in FIG. 1, the field devices 62-1 and 62-3 are the sensors, respectively. The field device 64-1 is the actuator. The field devices 62-1 and 62-3, the control and computation device 22, and the field device 64-1 form one control loop.

In the example illustrated in FIG. 1, the number of control loops is one. However, there may be a plurality of control loops. If there is a plurality of control loops, processes related to the individual control loops may be executed in parallel.

(Change Trend Determination Device)

Figure 2:
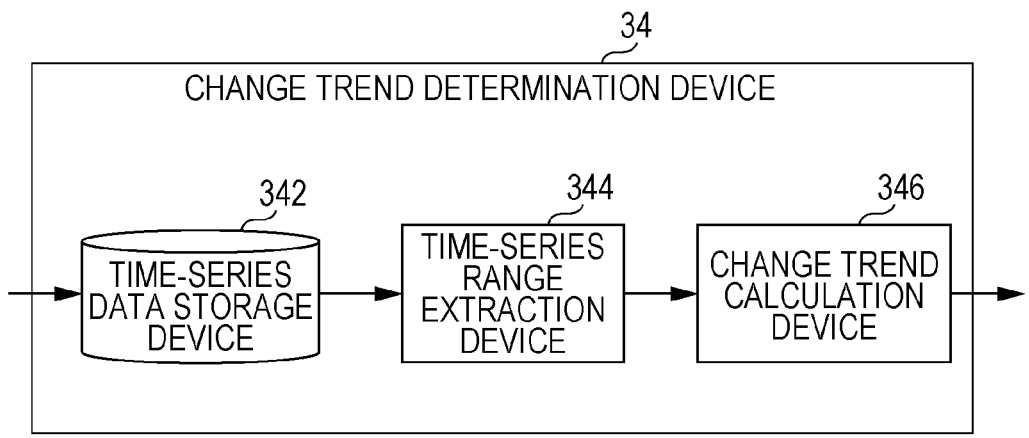
FIG. 2 is a block diagram illustrating an example of the configuration of a change trend determination device according to one or more embodiments of the present invention.

Next, an example of the configuration of the change trend determination device 34 according to one or more embodiments of the present invention is described. FIG. 2 is a block diagram illustrating an example of the configuration of the change trend determination device 34 according to one or more embodiments of the present invention.

The change trend determination device 34 includes a time-series data storage device 342, a time-series range extraction device 344, and a change trend calculation device 346. The change trend determination device 34 may include a computation device such as a one-chip CPU (central processing device).

The time-series data storage device 342 sequentially stores observed values inputted from the data acquisition device 32 (FIG. 1). The observed values are accumulated in the time-series data storage device 342 in the order of times when the observed values are acquired. A group of the accumulated observed values forms time-series data indicating the observed value at each point in time. The time-series data storage device 342 may include, for example, a FIFO (first-in first-out) buffer memory.

The time-series range extraction device 344 acquires, from the time-series data storage device 342, time-series data indicating an observed value at each point in time within a predetermined data acquisition period up to the current point in time. The data acquisition period is simply required to be a period including an analysis range from a reference point in time to the current point in time. The reference point in time is a past point a predetermined period of time back from the current point in time. The current point in time is not necessarily limited to a time at that point in time (the current time), and may be the latest time when an observed value is acquired. When the change trend calculation device 346 calculates a moving average at the reference point in time, the length of the data acquisition period is required to be at least double the length of the analysis range. The time-series range extraction device 344 outputs the acquired time-series data to the change trend calculation device 346.

The time-series data is inputted from the time-series range extraction device 344 into the change trend calculation device 346. The change trend calculation device 346 uses the time-series data to calculate a slope of a linear function indicating a change trend in an observed value at each point in time within the analysis range in such a manner as to minimize an objective function. The objective function is the weighted sum of squares of a difference value between a function value of the linear function and the observed value at each point in time. A weight coefficient at each point in time is required to become a higher numerical value as the elapsed time from the reference point in time to the point in time becomes longer.

The change trend calculation device 346 may calculate a centered moving average with the reference point in time as a central time by using the time-series data. The centered moving average is a simple average of function values at points in time within a moving average section. The moving average section is a section from a past point the analysis range back from the reference point in time to the current point in time. The length of the moving average section is called below a window size. Moreover, the centered moving average is simply called a moving average. The change trend calculation device 346 may calculate the intercept of the linear function in such a manner that a function value at the reference point in time is equal to the centered moving average. The change trend calculation device 346 may calculate a function value at each point in time within the analysis range on the basis of the calculated intercept and slope. The change trend calculation device 346 outputs change trend data indicating the calculated slope to the control apparatus 20 (FIG. 1). The change trend data may further include one or both of a function value and a moving average at each point in time.

The change trend calculation device 346 may discretize the value of the calculated slope and determine its state value (status). The change trend calculation device 346 further incorporates, in the change trend data, information on the determined state value. Discretization determines one of state values at predetermined levels. Candidates for possible state values are, for example, the following five levels:

"Sudden increase," "gentle increase," "constant," "gentle decrease," and "sudden decrease."

"Sudden increase" is given when the slope of the observed value is greater than a predetermined threshold 1. "Gentle increase" is given when the slope of the observed value is greater than a predetermined threshold 2 and is equal to or less than the threshold 1. "Constant" is given when the slope of the observed value is equal to or greater than a predetermined threshold 3 and is equal to or less than the threshold 2. "Gentle decrease" is given when the slope of the observed value is equal to or greater than a predetermined threshold 4 and is less than the threshold 3. "Sudden decrease" is given when the slope of the observed value is less than the threshold 4. Here, the thresholds 1 and 2 are positive values greater than zero. Moreover, the threshold 1 is greater than the threshold 2. The thresholds 3 and 4 are negative values less than zero. The threshold 4 is less than the threshold 3.

The change trend calculation device 346 is included in each change trend determination device 34. Hence, there is generally a plurality of the change trend calculation devices 346 in the control system 1. The method for calculating the slope and the size of the analysis range may be common among the plurality of the change trend calculation devices 346. Moreover, the size of the analysis range may be fixed at a preset value. Consequently, the engineering load is reduced.

(Method for Calculating Change Trend)

Next, a specific example of a method for calculating a change trend in time-series data is described.

Here, an observed value at time $t_i$ forming time-series data inputted into the change trend calculation device 346 is represented by $x_{t_i}$. i is an integer indicating the order of points in time. Time $t_N$ indicates a time at the current point in time. A window size W is preset in the change trend calculation device 346. The window size W corresponds to the number, 2K+1, of observed values within the moving average section. K is an integer equal to or greater than one indicating the number of observed values within the analysis range.

The change trend calculation device 346 calculates a moving average $<x_{t_{N-K}}>$ at a reference point in time $t_{N-K}$ being a past time point K back from the current point in time $t_N$. In this stage, the observed value at the current point in time $t_N$ is the latest observed value. At the point in time $t_N$, a moving average at a time later than the reference point in time $t_{N-K}$ cannot be calculated. Hence, the change trend calculation device 346 calculates a function value of a linear function indicating a change trend in the observed value at each time later than the reference point in time $t_{N-K}$. The change trend calculation device 346 employs the moving average $<x_{t_{N-K}}>$ at the reference point in time $t_{N-K}$ as a function value at the reference point in time $t_{N-K}$. The change trend calculation device 346 uses moments regression to calculate a slope $a_{t_N}$ of a linear function $<x_{t_{N-K}}>+a_{t_N}(t_{N-K+i}-t_{N-K})$ at each time $t_{N-K+i}$. Moments regression is, for example, a method for minimizing an objective function J illustrated in equation (1) to calculate the slope $a_{t_N}$.

[Math. 1]

$$J=\Sigma_{i=1}^{K}\{(x_{t_{N-K+i}}-<x_{t_{N-K}}>)-a_{t_N}(t_{N-K+i}-t_{N-K})\}^2(t_{N-K+i}-t_{N-K}) \quad (1)$$

In equation (1), $t_{N-K+i}-t_{N-K}$ indicates the elapsed time from the reference point in time $t_{N-K}$ at time $t_{N-K+i}$. Moreover, the value $<x_{t_{N-K}}>+a_{t_N}(t_{N-K+i}-t_{N-K})$ subtracted within { . . . } corresponds to a function value of the time $t_{N-K+i}$ of the linear function. Therefore, equation (1) indicates that the objective function is obtained by taking the sum of multiplied values within the analysis range, the multiplied values being obtained by multiplying, by the elapsed time $t_{N-K+i}-t_{N-K}$, a square value of a difference value obtained by subtracting the function value of the linear function from the observed value $x_{t_{N-K+i}}$ at time $t_{N-K+i}$. In equation (1), a portion represented by { . . . } is a term used in a normal least squares method.

The change trend calculation device 346 uses a relationship given by equation (2) when calculating the slope $a_{t_N}$ to minimize the objective function J illustrated in equation (1).

[Math. 2]

$$a_{t_N} = \frac{\sum_{i=1}^{K}(x_{t_{N-K+i}} - <x_{t_{N-K}}>)(t_{N-K+i} - t_{N-K})^2}{\sum_{i=1}^{K}(t_{N-K+i} - t_{N-K})^3} \quad (2)$$

Equation (2) is derived from a condition that the derivative obtained by differentiating the objective function J with respect to the slope $a_{t_N}$ is zero.

In the above-mentioned example, when the objective function J is calculated, the square value of the difference value is multiplied by the elapsed time $t_{N-K+i}-t_{N-K}$. Hence, the newer the observed value is, the more the difference value between the observed value and the function value contributes to the objective function J. Hence, the temporal change of an observed value close to the current point in time is more focused. Therefore, the function value indicating a change trend close to the intuition of the user is estimated without generating a delay in the phase of the function value with respect to the phase of the observed value.

As long as the set analysis range up to the current point in time $t_N$ is a fixed period of time, the change trend calculation device 346 can calculate the slope $a_{t_N}$ by using equation (2) even if a missing point where the observed value cannot be acquired is present in a part of the analysis range. Hence, even if there is missing data in a situation where the measurement value from the field device 62-1 or 62-3 (FIG. 1) cannot be temporarily measured, for example, when a temporary failure occurs in the whole or a part of the function of the I/O module 30-1 or 30-3, when the whole or a part of the function of the module temporarily stops, or when there is transmission loss caused by the control network NW, the function value can be stably calculated.

The above-mentioned example can also be applied to a case where the intervals between points in time are irregular. However, when the intervals between points in time are constant intervals d, equation (1) is modified as illustrated in equation (3).

[Math. 3]

$$J=\Sigma_{i=1}^{K}\{(x_{t_{N-K+i}}-<x_{t_{N-K}}>)-a_{t_N}id\}^2id \quad (3)$$

In equation (3), the time $t_i$ is $t_1+(i-1)$ d. The relationship illustrated in equation (4) is obtained as the condition that the derivative obtained by differentiating the objective function J illustrated in equation (3) with respect to the slope $a_{t_N}$ is zero.

[Math. 4]

$$a_{t_N} = \frac{\sum_{i=1}^{K}(x_{t_{N-K+i}} - <x_{t_{N-K}}>)(id)^2}{\sum_{i=1}^{K}(id)^3} \quad (4)$$

The denominator of equation (4) is a constant. The value of the constant is $K^2(K+1)^2 \cdot d^3/4$. The change trend calculation device 346 is simply required to use a preset constant when calculating the slope $a_{t_N}$ by using the relationship illustrated in equation (4). A process for sequentially calculating constants is omitted to further reduce the amount of calculation. Hence, placement in a device whose computation resource is relatively small (for example, an incorporated device), or the like becomes easy.

The case where a weight coefficient $w_i$ by which the square value of the difference between the observed value at each point in time $t_{N-K+i}$ and the function value is multiplied is proportional to the elapsed time $t_{N-K+i}-t_{N-K}$ from the reference point in time $t_{N-K}$ is taken as an example of the objective function J illustrated in equation (3). However, the objective function J is not limited to this example. The weight coefficient $w_i$ may be generalized to a monotonously increasing positive value with the increasing elapsed time $t_{N-K+i}-t_{N-K}$. It is also possible to preset the weight coefficient $w_i$ as an element value of a K-dimensional weight coefficient vector in the change trend calculation device 346. In this case, the objective function J illustrated in equation (3) is generalized as illustrated in equation (5).

[Math. 5]

$$J = \sum_{i=1}^{K}\{(x_{t_{N-K+i}} - <x_{t_{N-K}}>) - a_{t_N}id\}^2 w_i \quad (5)$$

The relationship illustrated in equation (6) is obtained as a condition that the derivative obtained by differentiating the objective function J illustrated in equation (5) with respect to the slope $a_{t_N}$ is zero. The change trend calculation device 346 may calculate the slope $a_{t_N}$ by using equation (6).

[Math. 6]

$$a_{t_N} = \frac{\sum_{i=1}^{K}(x_{t_{N-K+i}} - <x_{t_{N-K}}>)id \cdot w_i}{\sum_{i=1}^{K}(id)^2 w_i} \quad (6)$$

If the intervals between points in time are irregular, the change trend calculation device 346 may calculate the slope $a_{t_N}$ by using equation (7).

[Math. 7]

$$a_{t_N} = \frac{\sum_{i=1}^{K}(x_{t_{N-K+i}} - <x_{t_{N-K}}>)(t_{N-K+i} - t_{N-K})w_i}{\sum_{i=1}^{K}(t_{N-K+i} - t_{N-K})^2 w_i} \quad (7)$$

Equation (7) is obtained by replacing the elapsed time $t_{N-K+i}-t_{N-K}$ from the reference point in time $t_{N-K}$ in equation (2) with the weight coefficient $w_i$.

Moreover, as illustrated in equation (8), the change trend calculation device 346 may calculate the slope $a_{t_N}$ by using, as the weight coefficient $w_i$, a function w(t) depending on the elapsed time t from the reference point in time $t_{N-K}$.

[Math. 8]

$$a_{t_N} = \frac{\sum_{i=1}^{K}(x_{t_{N-K+i}} - <x_{t_{N-K}}>)(t_{N-K+i} - t_{N-K})w(t_{N-K+i} - t_{N-K})}{\sum_{i=1}^{K}(t_{N-K+i} - t_{N-K})^2 w(t_{N-K+i} - t_{N-K})} \quad (8)$$

As an example, the above-mentioned change trend calculation device 346 calculates a slope indicating a temporal change trend in the observed value at each point in time in such a manner as to minimize the weighted sum of squares of the difference value between the observed value at each point in time and the function value of the linear function as the objective function. However, the calculation method is not limited to this. For example, the change trend calculation device 346 may calculate the slope indicating the temporal change trend in the observed value at each point in time in such a manner as to minimize the sum of squares of the difference value between the observed value at each point in time and the function value of the linear function as the objective function. The change trend calculation device 346 may cause a predetermined first derivative filter to act on the observed value to calculate the slope. The first derivative filter is, for example, a filter for calculating a difference between an observed value at the following point in time and an observed value at a previous point in time as the slope at the current point in time.

The change trend determination device 34 may be configured in such a manner as to be detachable from the I/O module 30. The I/O module 30 includes, for example, a base plate having a connection terminal to which the field device 62 is connected, and an option module. The option module is provided in such a manner as to be detachable from the base plate, and includes the change trend determination device 34. The change trend determination device 34 calculates a slope indicating a temporal change trend in observed values inputted from the field device 62 via the connection terminal to output change trend data indicating the calculated slope to the control apparatus 20. The option module is described in detail in, for example, Japanese Patent No. 5904190.

Moreover, in the above description, the case where each I/O module 30 includes the change trend determination device 34 is illustrated by example. However, the placement of the change trend determination device 34 is not limited to this example. A change trend determination device having a similar functional configuration to the change trend determination device 34 may be provided in the field device 62. The change trend determination device calculates a slope indicating a temporal change trend in an observed value measured by the field device 62 itself. The change trend determination device associates the calculated slope with the observed value to transmit them to the I/O module 30 connected to the field device 62 itself. The change trend determination device 34 may be omitted in the I/O module 30 being a transmission destination.

(Terminal Apparatus)

Figure 3:
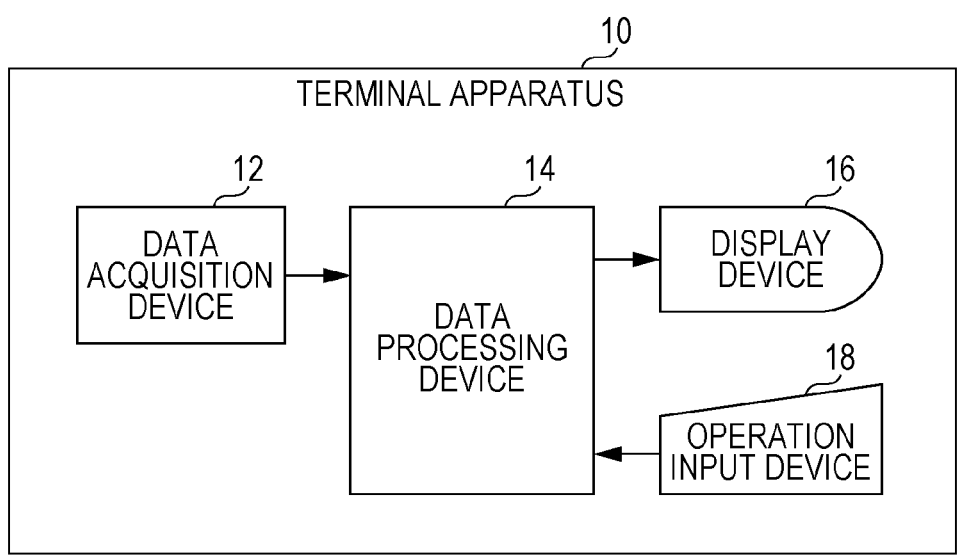
FIG. 3 is a block diagram illustrating an example of the configuration of a terminal apparatus according to one or more embodiments of the present invention.

Next, an example of the configuration of the terminal apparatus 10 according to one or more embodiments of the present invention is described. FIG. 3 is a block diagram illustrating an example of the configuration of the terminal apparatus 10 according to one or more embodiments of the present invention.

The terminal apparatus 10 includes a data acquisition device 12, a data processing device 14, a display device 16, and an operation input device 18.

The data acquisition device 12 receives time-series data indicating an observed value at each point in time from the control apparatus 20. The received time-series data is outputted by the data acquisition device 12 to the data processing device 14. Moreover, the data acquisition device 12 may receive change trend data corresponding to the time-series data from the control apparatus 20. In this case, the data acquisition device 12 associates the time-series data with the change trend data and outputs the data to the data processing device 14. The data acquisition device 12 is, for example, a communication interface. The data acquisition device 12 is wired or wirelessly connected to the control network NW. Means for the data acquisition device 12 acquiring data is not necessarily the control network NW. The data acquisition device 12 may acquire data stored in a detachable storage medium (such as flash memory) that is physically mounted thereon.

The data processing device 14 generates graph data illustrating an observed value at each point in time on the basis of the time-series data inputted from the data acquisition device 12. The data acquisition device 12 inputs the change trend data corresponding to the time-series data into the data processing device 14. In this case, the data processing device 14 may generate graph data further illustrating the slope at the current point in time. Here, the data processing device 14 may generate graph data further illustrating a moving average at each point in time before the reference point in time, and a function value at each point in time after the reference point in time. When generating graph data, the data processing device 14 converts each of each numerical value and a time at each point in time into a coordinate value in the vertical or horizontal direction. Forms (for example, any of color, shape, line type, line width, and size, or any combination thereof) of symbols and graphics indicating the observed value, the function value, and the moving average, and forms (for example, any of thickness, size, font type, and font style, or any combination thereof) of characters may be different between these values. The data processing device 14 outputs the generated graph data to the display device 16.

If the change trend data to be inputted contains information on a state value, the data processing device 14 may output, to the display device 16, notification information containing the information on the state value. The information on the state value is displayed on the display device 16. The data processing device 14 may determine whether or not the acquired information on the latest state value of a certain channel has been changed from information on a state value acquired immediately before the information on the latest state value of the certain channel. When the data processing device 14 has determined that the information has been changed, the changed information on the state value may be outputted by the data processing device 14 to the display device 16, and when the data processing device 14 has determined that the information on the state value has not been changed, the information on the state value may not be outputted. Consequently, the user can easily notice a change in the state related to the channel, and further a sign of an abnormality resulting from the change.

The data processing device 14 may control the display of an observed value on the basis of information instructed by an operation signal inputted from the operation input device 18. For example, the data processing device 14 may update the analysis range set by the change trend calculation device 346 to a period instructed by the operation signal. When time-series data of a plurality of channels is inputted into the data processing device 14, the data processing device 14 may update time-series data of channels targeted for processing to time-series data of channels instructed by the operation signal. In this case, for example, an input value inputted from the field device 62-1, an output value outputted to the field device 64-1, an input value inputted from the field device 62-3, a deviation of the output value from its target value, and state quantities indicating the states of the I/O modules 30-1 to 30-3 can be processing targets as observed values related to the time-series data of the instructed channels.

Moreover, the data processing device 14 may perform a process related to the management of the control apparatus 20 on the basis of the information instructed by the operation signal inputted from the operation input device 18. For example, the data processing device 14 specifies a target value instructed by the operation signal, as a control target value. The data processing device 14 may specify a parameter for offering the target value. The data processing device 14 transmits, to the control apparatus 20, instruction information indicating the specified target value or parameter.

The display device 16 illustrates by example an observed value and a function value at each point in time, which represent the graph data inputted from the data processing device 14. Examples of the display device 16 include an LCD (liquid crystal display) and an OELD (organic electro luminescence display).

The operation input device 18 accepts user operation, and generates an operation signal in accordance with the accepted operation. The operation input device 18 outputs the generated operation signal to the data processing device 14. Examples of the operation input device 18 include an operation input device including general-purpose members such as a mouse, a keyboard, and a touchscreen, and an operation input device including dedicated members such as a button, a lever, and a knob.

(Modification)

Next, a modification of one or more embodiments of the present invention is described.

Figure 4:
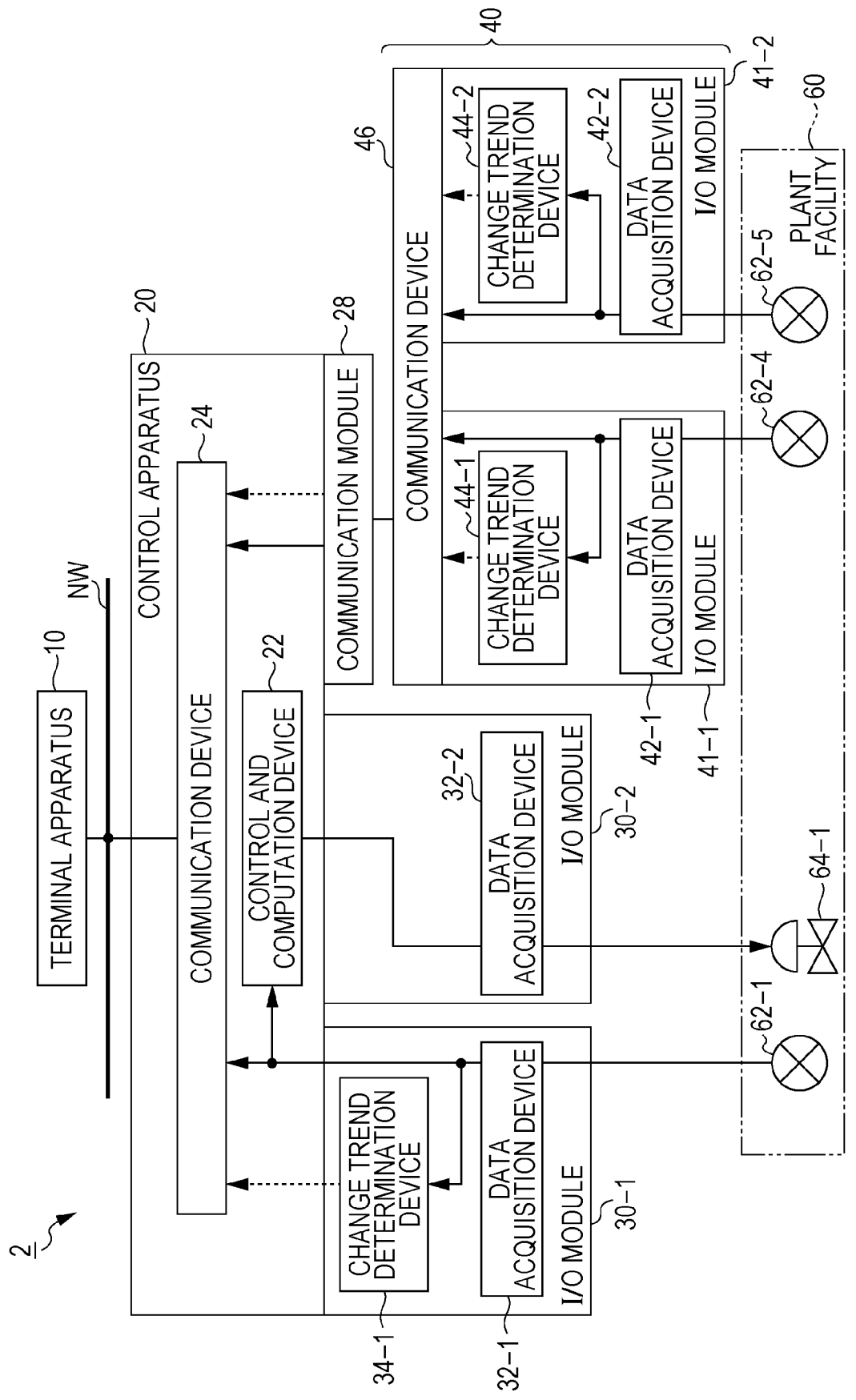
FIG. 4 is a block diagram illustrating an example of the configuration of a control system according to a modification of one or more embodiments of the present invention.

FIG. 4 is a block diagram illustrating an example of the configuration of a control system 2 according to the modification.

The control system 2 according to the modification includes the terminal apparatus 10, the control apparatus 20, the I/O module 30, and a remote I/O node 40.

The remote I/O node 40 is communicably and wired or wirelessly connected to the control apparatus 20.

The remote I/O node 40 is a relay apparatus configured in such a manner as to include I/O modules 41 and a communication device 46.

In an example illustrated in FIG. 4, the remote I/O node 40 includes two I/O modules 41. The I/O module 41 has the same configuration as the I/O module 30. In other words, a data acquisition device 42 and a change trend determination device 44 of the remote I/O node 40 have the same configurations as the data acquisition device 32 and the change trend determination device 34 of the I/O module 30, respectively. However, the data acquisition device 42-1 outputs time-series data taking an input value at each point in time inputted from the field device 62-4 as the observed value to the change trend determination device 44-1 and the communication device 46. The data acquisition device 42-2 outputs time-series data taking an input value at each point in time inputted from the field device 62-5 as the observed value to the change trend determination device 44-2 and the communication device 46.

The communication device 46 transmits, to the control apparatus 20, time-series data inputted from the I/O module 41 and change trend data generated on the basis of the time-series data. Moreover, the communication device 46 may output, to the I/O module 41, an output value indicated by the time-series data received from the control apparatus 20 (not illustrated). The communication device 46 generally aggregates time-series data indicating input values of a plurality of channels. The aggregated time-series data indicating output values of a plurality of channels is distributed by the communication device 46.

In the example illustrated in FIG. 4, each of the I/O modules 41-1 and 41-2 is configured as a part of the remote I/O node 40 in such a manner as to be integrated with the other part of the remote I/O node 40. However, the I/O modules 41-1 and 41-2 are not limited to this example. Each of the I/O modules 41-1 and 41-2 may be configured as an independent device in such a manner as to be detachable from the other part of the remote I/O node 40.

Moreover, the communication device 46 may have a gateway function. In other words, the communication device 46 may transmit data received from another remote I/O node 40 different from its own remote I/O node 40 to a transmission destination device being a transmission destination. The transmission destination device may be the control apparatus 20, and may further be another remote I/O node 40. The communication device 46 may transmit data received from the control apparatus 20 to its transmission destination that is another I/O module 41. Therefore, the remote I/O node 40 as a whole also functions as a gateway apparatus.

The control apparatus 20 includes a communication module 28 instead of the I/O module 30-3 (FIG. 1).

The communication module 28 is communicably and wired or wirelessly connected to the remote I/O node 40. The communication module 28 outputs, to the communication device 24, the time-series data and change trend data received from the remote I/O node 40. Time-series data indicating an output value at each point in time may be inputted from the control and computation device 22 into the communication module 28 (not illustrated)). In this case, the communication module 28 transmits the time-series data inputted into the remote I/O node 40 connected to the field device 62 being an output destination.

Moreover, the communication device 28 may be configured as a single device in such a manner as to be detachable from the control apparatus 20. Moreover, the communication module 28 may be configured as a part of the control apparatus 20. The communication module 28 may be configured as a function device independent of the communication device 24. Furthermore, the communication module 28 may be configured as a function device integral with the communication device 24. Moreover, a network connecting the communication module 28 and the remote I/O node 40 may be a network different from the control network NW, or be a part of the control network NW.

In the above-mentioned description, the case where each I/O module 41 includes the change trend determination device 44 is illustrated by example. However, the placement of the change trend determination device 44 is not limited to this example. The remote I/O node 40 may include the change trend determination device 44 in a portion different from the I/O module 41. The change trend determination device 44 calculates a slope indicating a temporal change trend in observed values indicated by time-series data of each channel inputted from the I/O module 41. The change trend determination device 44 transmits change trend data indicating the calculated slope to the control apparatus 20 via the communication device 46. In this case, the change trend determination device 44 may be omitted in the I/O module 41.

Moreover, the control system 2 may further include a gateway apparatus (not illustrated). The gateway apparatus includes a change trend determination device having a similar functional configuration to the change trend determination device 44. Here, a communication device of the gateway apparatus receives time-series data per channel by wired or wireless connection from the remote I/O node 40 placed in a lower layer. Here, the lower layer indicates a portion logically closer to the plant facility 60 than the terminal apparatus 10 in the device configuration of the control system 2. The change trend determination device calculates a slope indicating a temporal change trend in the observed value indicated by the time-series data of each channel received by the communication device. The change trend determination device transmits change trend data indicating the calculated slope by wired or wireless connection to a device in a higher layer (an upper device) via the communication device. Here, the higher layer indicates a portion (layer) logically closer to the terminal apparatus 10 than the plant facility 60. In this case, the change trend determination device 44 may be omitted in the remote I/O node 40 placed in the lower layer.

As described above, the electronic device (for example, the I/O modules 30 and 41) according to one or more embodiments of the present invention includes the acquisition device (for example, the data acquisition devices 32 and 42) that acquires time-series data indicating an observed value at each point in time, and the change trend calculation device (for example, the change trend calculation device 346) that calculates a change trend in an observed value at each point in time with respect to time.

According to the configuration, the load of interpretation of a change trend in observed values and prediction of future values on a user who observes the time-series data acquired by the electronic device is reduced. Hence, it is possible to appropriately grasp the change trend in observed values. As a result, it is possible to monitor substantially more time-series data due to the reduction of the load for each individual observed value.

Moreover, the electronic device according to one or more embodiments of the present invention includes the time-series range extraction device (for example, the time-series range extraction device 344). The time-series range extraction device extracts time-series data indicating an observed value at one or each of a plurality of points in time within the analysis range from a first point in time to a second point in time. The change trend calculation device calculates a slope of a linear function indicating a change trend in observed values within the analysis range in such a manner as to minimize an objective function. Here, the objective function is the sum of multiplied values at points in time within the analysis range. The multiplied value is a numerical value obtained by multiplying a square value of a difference between a function value of the linear function and the observed value by a weight coefficient. The weight coefficient is a numerical value that becomes greater with increasing elapsed time from the first point in time to each point in time.

According to the configuration, the slope of the linear function is calculated, placing more importance on an observed value at a point in time closer to the current point in time. Hence, the phase of the function value of the linear function indicating the change trend in observed values is not delayed with respect to the observed value at the current point in time. Therefore, a random temporal change is reduced or removed as the slope of the observed value. In addition, a value is obtained which represents the quantified change trend in observed values matching the intuition of a person. Hence, the user can easily judge the change trend in the state of a monitoring target.

Next, another example of one or more embodiments of the present invention is described. The same reference numerals are assigned to the same configurations as the above-mentioned embodiments, quoting their descriptions.

Figure 5:
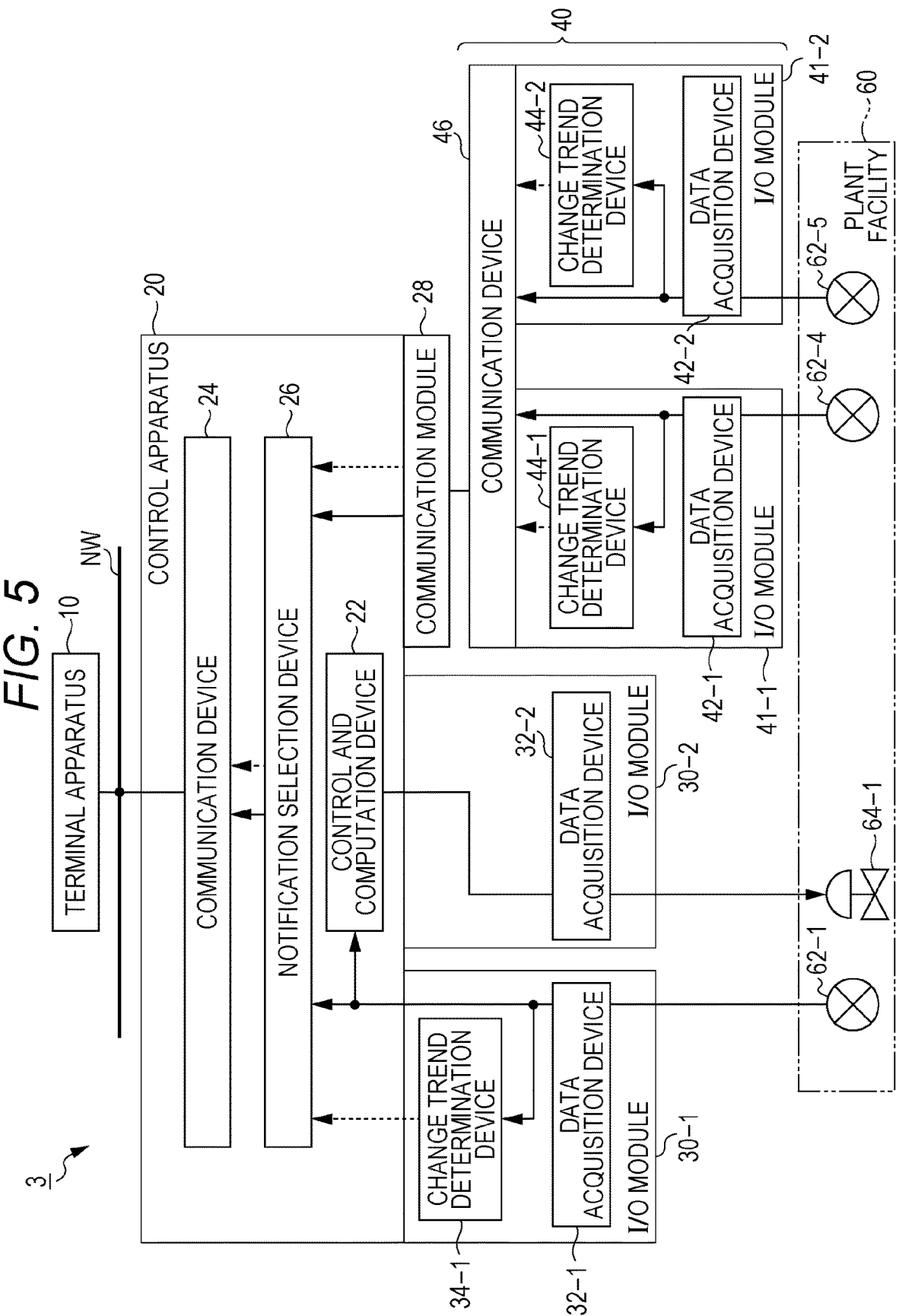
FIG. 5 is a block diagram illustrating an example of the configuration of a control system according to one or more embodiments of the present invention.

FIG. 5 is a block diagram illustrating an example of the configuration of a control system 3 according to one or more embodiments of the present invention.

The control system 3 includes the terminal apparatus 10, the control apparatus 20, the I/O module 30, and the remote I/O node 40.

The control apparatus 20 according to one or more embodiments of the present invention includes the control and computation device 22, the communication device 24, a notification selection device 26, and the communication module 28.

Time-series data and change trend data based on the time-series data are inputted, according to the channel, from each of the I/O module 30 and the communication module 28 into the notification selection device 26. The notification selection device 26 determines, on the basis of a slope indicated by the change trend data, whether or not it is necessary in each channel to notify the corresponding time-series data to an upper device. Here, the time-series data and change trend data inputted into the notification selection device 26 are described with reference to FIG. 6. In an example illustrated in FIG. 6, time-series data of N channels is inputted into the notification selection device 26. Time-series data of each channel indicates an input value at each point in time outputted from each of the field devices 62-1 to 62-N. The change trend determination devices 34-1 to 34-N input change trend data corresponding to the time-series data acquired from each of the field devices 62-1 to 62-N. Each of the change trend determination devices 34-1 to 34-N illustrated in FIG. 6 corresponds to the change trend determination device included in any of the I/O module 30 and the communication module 28, that is, any of the data acquisition devices 32-1, 42-1, and 42-2 illustrated in FIG. 5. Channels related respectively to the field devices 62-1 to 62-N are called channels 1 to N below.

The notification selection device 26 determines that, for example, time-series data of a channel having a greater absolute value of the slope than a predetermined slope threshold is data that requires a notification. The notification selection device 26 determines that time-series data of a channel offering an absolute value of the slope equal to or less than the slope threshold is data that does not require a notification.

Figure 6:
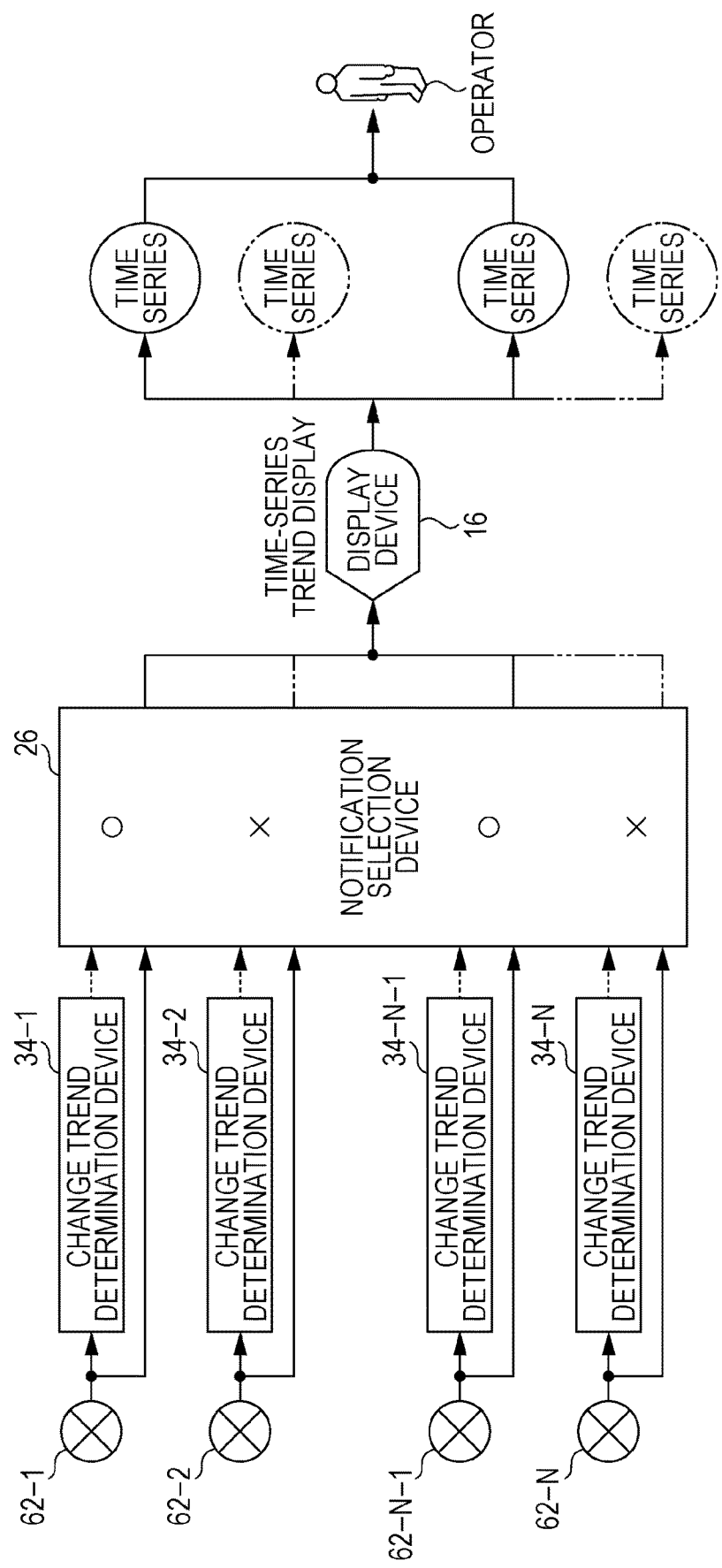
FIG. 6 is an explanatory diagram of the function of a notification selection device according to one or more embodiments of the present invention.

In the example illustrated in FIG. 6, it is determined that time-series data of channels 1 and N−1 require a notification (hereinafter referred to as notification required) (y), and it is determined that time-series data of channels 2 and N do not require a notification (hereinafter referred to as notification not required) (n). The notification selection device 26 then outputs, to the communication device 24, the time-series data of the channels determined to be notification required, and change trend data of the channels. Consequently, the outputted time-series data of the channels and change trend data corresponding to the time-series data are transmitted to the terminal apparatus 10. Therefore, a time series of observed values at points in time of channels 1 and N−1, and a slope of the observed values are displayed on the display device 16 of the terminal apparatus 10. On the other hand, neither a time series of observed values at points in time of channels 2 and N nor a slope related to the observed values are displayed on the display device 16 of the terminal apparatus 10. Hence, the user (operator) can focus on the monitoring of the observed values related to channels 1 and N−1 displayed on the display device 16.

Figure 7:
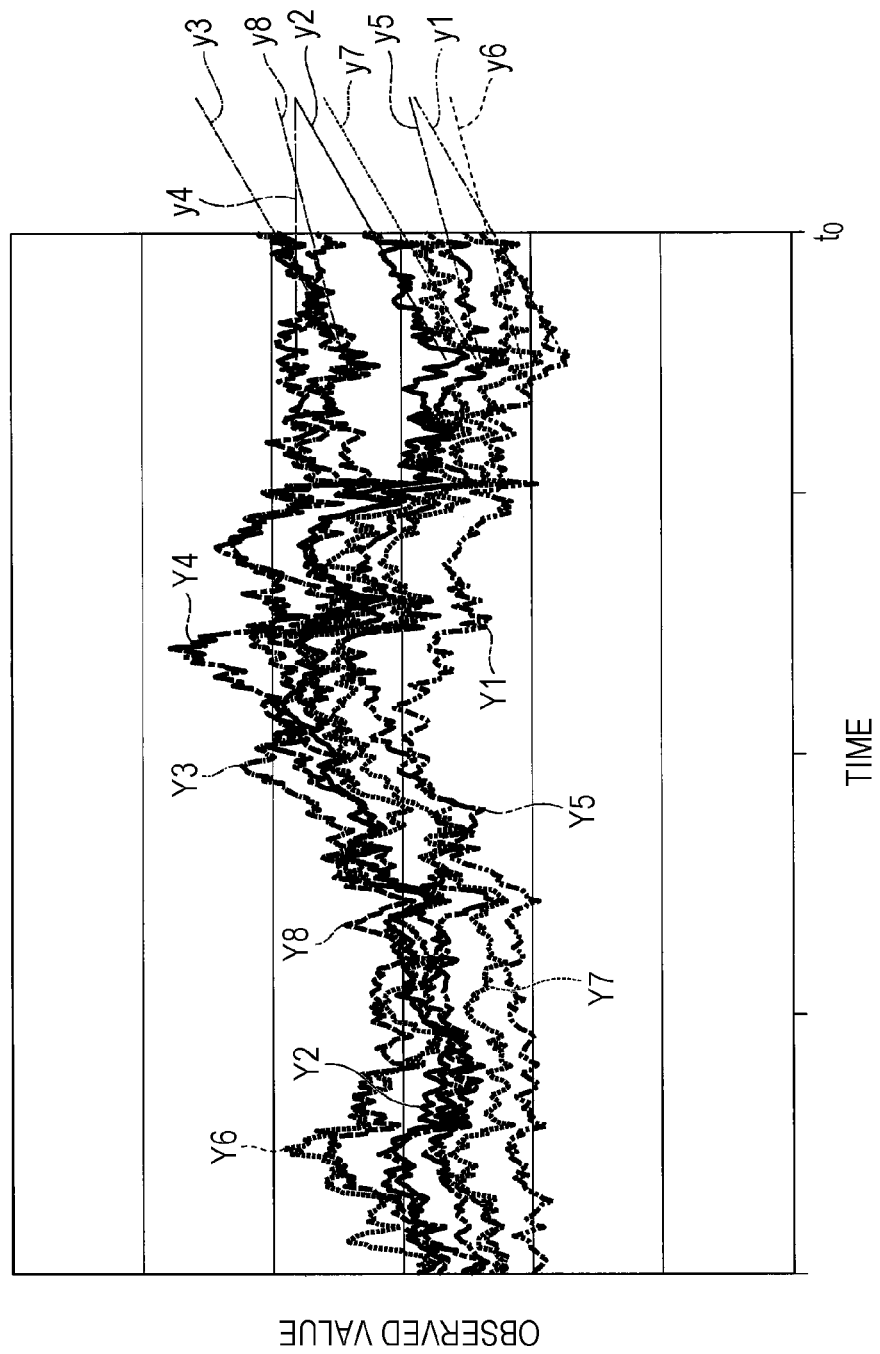
FIG. 7 is a diagram illustrating a display example of time series and slopes of observed values according to one or more embodiments of the present invention.

FIG. 7 is a diagram illustrating a display example of time series of observed values and slopes of the observed values at the current point in time, $t_0$. In an example illustrated in FIG. 7, time-series data Y1 to Y8 of eight channels and their corresponding slopes y1 to y8 of the observed values at the current point in time, $t_0$, are indicated by solid lines and broken lines, respectively. The time-series data of the eight channels are all time-series data acquired via the control apparatus 20 that does not include the notification selection device 26. In this example, the observed values of the eight channels at the current point in time, $t_0$, are distributed in a relatively small area. Moreover, the magnitudes of the slopes y1 to y8 and their being positive or negative change according to the channels. Hence, it may be difficult for the user to immediately grasp a change trend in observed values of each individual channel.

Figure 8:
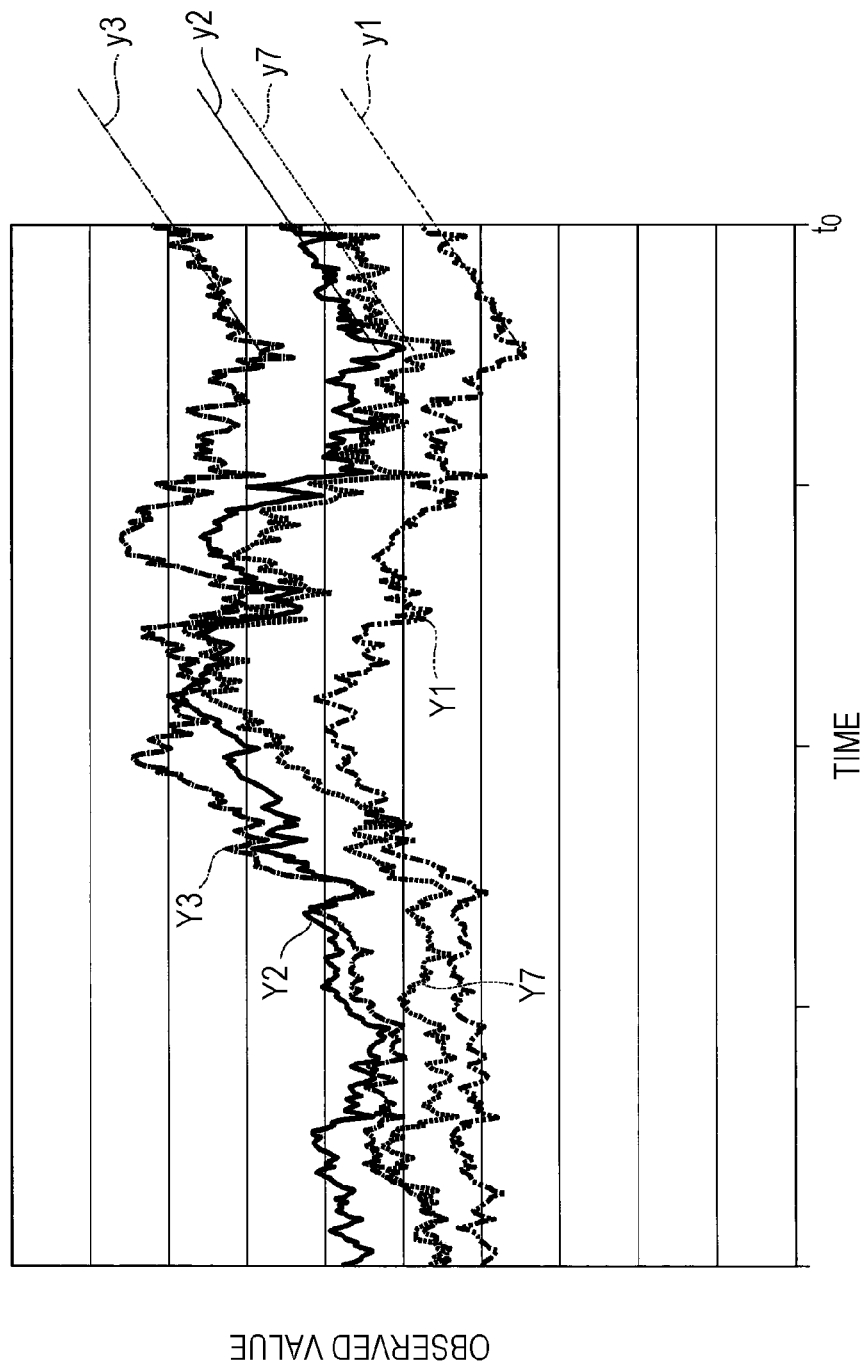
FIG. 8 is a diagram illustrating another display example of time series and slopes of observed values according to one or more embodiments of the present invention.

FIG. 8 is a diagram illustrating another display example of time series of observed values and slopes of the observed values at the current point in time, $t_0$. FIG. 8 illustrates the time-series data Y1, Y2, Y3, and Y7 of four channels selected by the notification selection device 26 from the time-series data of the eight channels, and their corresponding slopes y1, y2, y3, and y7 of the observed values at the current point in time, $t_0$. All of absolute values of the slopes y1, y2, y3, and y7 are greater than the predetermined slope threshold. In other words, the time-series data Y1, Y2, Y3, and Y7 including remarkable slopes of the observed values at the current point in time, $t_0$, and their slopes y1, y2, y3, and y7 are displayed. Neither the other time-series data nor their slopes are displayed. Hence, the user can more easily grasp an observed value change trend of each individual channel for the channels where the slope of the observed values is remarkable at the current point in time, $t_0$.

In the above description, the case is illustrated by example in which the notification selection device 26 determines whether or not it is necessary to notify time-series data of a channel depending on whether or not an absolute value of a slope is greater than the predetermined slope threshold. However, a criterion of determination on the necessity or unnecessity of a notification is not limited to this. The number of channels of time-series data determined by the notification selection device 26 to be notification required may be predetermined as the number of notification channels. If the number of channels of time-series data to be inputted is greater than the number of notification channels, the notification selection device 26 may sort channels in the descending order of absolute values of the slopes indicated by change trend data, and determine time-series data of a channel whose absolute value of the slope is the highest to a channel at the number of notification channels to be notification required. The notification selection device 26 may then determine the other time-series data to be notification not required. In this case, the threshold of the slope is not necessarily set in the notification selection device 26.

Moreover, there may be a case where it is clear that there is a trend that after a change in an observed value of a certain specific channel, an observed value of another channel changes due to the characteristics of the plant facility 60 (tailgating). Such a case can occur when a measurement portion of the observed value of the other channel is placed in the plant facility 60, physically downward of a measurement portion of the observed value of the specific channel In this case, the notification selection device 26 may give a higher priority to the time-series data of the specific channel than to the time-series data of the other channel to be tailgated, and determine the time-series data of the specific channel to be notification required.

Here, examples of cases where "tailgating" happens also include a tailgate alarm (a tailgate alarm) where an abnormality also occurs as a side effect in a certain place, triggered by an alarm generated by an abnormality in another place in the plant. For example, if an abnormal flow rate occurs upstream, an abnormal flow rate also occurs downstream due to the influence of the upstream abnormal flow rate.

The notification selection device 26 may transmit notification channel information indicating the channels determined to be notification required to the terminal apparatus 10 via the communication device 24. When having received the notification channel information from the control apparatus 20 via the data acquisition device 12, the data processing device 14 of the terminal apparatus 10 may output notification information containing the notification channel information to the display device 16. The notification information inputted from the data processing device 14 is displayed as, for example, alarm information on the display device 16. Here, the data processing device 14 may generate graph data indicating a configuration diagram illustrating components of the plant facility 60. The data processing device 14 may output the generated graph data to the display device 16. The data processing device 14 may place a graphic indicating the field device 62 of the plant facility 60 as the notification information at a measurement point and a manipulation point on the configuration diagram, the points being a portion where the field device 62 is installed. The display form of the graphic may be different from a graphic indicating another field device 62. If the field device 62 is, for example, a temperature sensor for measuring the temperature of a fluid flowing through a pipe included in the plant facility 60, a graphic indicating the temperature sensor placed in a portion of the pipe on a calibration diagram blinks. The user can grasp a channel where a change in the observed value is remarkable, and accordingly can easily notice a change in the state in the portion.

In the above description, the case where the notification selection device 26 determines the necessity or unnecessity of a notification, according to the channel, on the basis of an absolute value of a slope is illustrated by example. However, a numerical value based on the determination is not limited to this example. The notification selection device 26 may determine the necessity or unnecessity of a notification on the basis of the expected time from the current point in time to a point in time when the observed value exceeds a predetermined threshold. More specifically, one or both of an upper threshold and a lower threshold within an allowable range of an observed value of each channel may be preset, as a limit value(s) of the observed value, in the notification selection device 26. The notification selection device 26 calculates a difference between the threshold and an observed value at the current point in time. The notification selection device 26 calculates a time period obtained by dividing the calculated difference by a slope of the observed value, as the expected time. When the calculated expected time is equal to or less than a predetermined expected time threshold, then the notification selection device 26 determines that time-series data of the channel to be notification required. Moreover, when the calculated expected time is greater than the predetermined expected time threshold, the notification selection device 26 determines the time-series data of the channel to be notification not required. Hence, if there is a possibility that the observed value exceeds the threshold within the allowable range within the expected time, notification information related to the channel is displayed on the display device 16 of the terminal apparatus 10.

Moreover, there is a case where the number of channels whose observed value falls to or below the threshold within the allowable range within the predetermined expected time exceeds a predetermined number of channels. In this case, the notification selection device 26 may give a higher priority to a channel having a shorter expected time that is taken to go out of the allowable range, and select the channel as a channel that requires a notification. More specifically, the notification selection device 26 sorts expected times calculated respectively for the channels in ascending order. The predetermined number of channels is selected as the channels that require a notification in the ascending order of the expected times, starting with the channel having the shortest expected time. The other channels are determined to be notification not required. In this case, the threshold for the expected time may not be set in the notification selection device 26.

The data processing device 14 may cause the notification information displayed to blink at predetermined time intervals (for example, 0.3 to 1 s). Alternatively, the display form may be randomly switched. Forms (for example, any of thickness, size, font type, and font style, or any combination thereof) of characters indicating the notification information, and forms (for example, any of color, shape, line type, line width, and size, or any combination thereof) of the graphics are switching targets as the display form. Consequently, the user can more easily notice changes in the states of the plant and devices.

Figure 9:
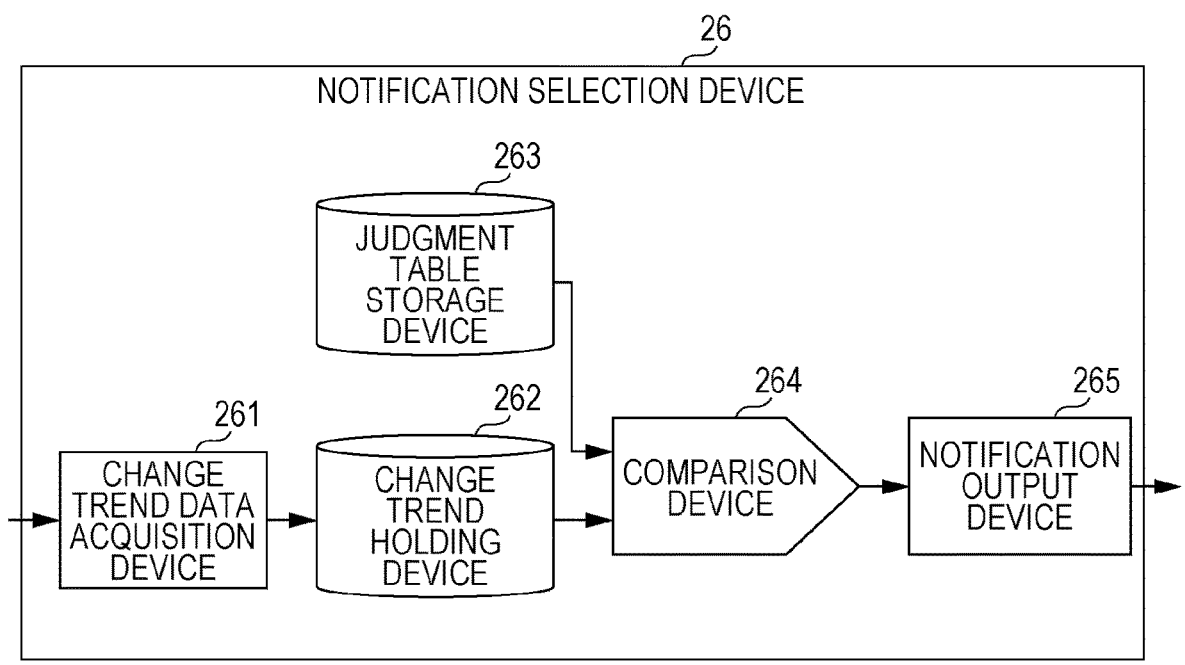
FIG. 9 is a block diagram illustrating an example of the configuration of a notification selection device according to a modification of one or more embodiments of the present invention.

The notification selection device 26 may have a configuration illustrated in FIG. 9. In an example illustrated in FIG. 9, the notification selection device 26 is configured including a change trend data acquisition device 261, a change trend holding device 262, a judgment table storage device 263, a comparison device 264, and a notification output device 265. The change trend data acquisition device 261 outputs a state value discretized according to the channel, to the change trend holding device 262.

The change trend data acquisition device 261 acquires change trend data per channel from each of the I/O module 30 and the communication module 28. The change trend data acquisition device 261 extracts a state value from the change trend data, according to the channel. The change trend data acquisition device 261 outputs the extracted state value to the change trend holding device 262.

The change trend holding device 262 temporarily holds the state value of each channel inputted from the change trend data acquisition device 261. The state value of each channel to be held indicates a change trend of the latest observed value. In other words, the change trend holding device 262 aggregates a pattern of the state values indicating change trends at the current point in time from channel to channel.

A judgment table for predetermined individual events is previously stored in the judgment table storage device 263. An abnormality in the state of the plant facility 60, or a state (sign) where there is a possibility of the occurrence of an abnormality, is adopted as the event. The judgment table for the individual events is configured in such a manner as to include a typical state value of each channel upon the occurrence of the event. In other words, the judgment table indicates a pattern of the state values from channel to channel according to the event. Moreover, information indicating a specific channel is further associated for each event in the judgment table. A channel related to a measurement portion closest to (for example, most upstream of) a cause of the occurrence of the event is set as the specific channel. Examples of the judgment table are described below.

A pattern of state values from channel to channel held in the change trend holding device 262 is read into the comparison device 264. The read pattern is compared with the patterns according to the events indicated by the judgment table stored in the judgment table storage device 263. The comparison device 264 determines that a pattern matching the pattern read from the change trend holding device 262 among the patterns of the events indicated by the judgment table is a pattern corresponding to the read pattern. The comparison device 264 determines a specific channel corresponding to the determined pattern. The comparison device 264 outputs channel selection information indicating the determined channel to the notification output device 265.

The notification output device 265 specifies the channel indicated by the channel selection information inputted from the comparison device 264. The notification output device 265 transmits notification channel information indicating the specified channel to the terminal apparatus 10 via the communication device 24 (FIG. 5). Moreover, the notification output device 265 may select time-series data and change trend data, which are related to the specified channel, from time-series data and change trend data of each channel acquired from each of the I/O module 30 and the communication module 28. The notification output device 265 transmits the selected time-series data and change trend data to the terminal apparatus 10 via the communication device 24.

(Patterns of Observed Value Change Trends)

Next, examples of patterns of observed value change trends are described. FIG. 10A illustrates an example of a pattern of change trends from channel to channel, the patterns being held in the change trend holding device 262. A first column, a second column, and a third column of FIG. 10A respectively indicate a channel, a slope of observed values at the current point in time, and a state value (status) of the slope. Moreover, a rightward-directed arrow, an upward-and-rightward-directed arrow, and a downward-and-leftward directed arrow, which are enclosed by a circle, respectively indicate that the state value is "constant," "sudden increase," and "sudden decrease." In an example illustrated in a second row of FIG. 10A, the slope and the state value are respectively "0.01" and "constant" for channel 42-2. In an example illustrated in the N-th row, the slope and the state value are respectively "0.98" and "sudden increase" for channel 42-N. The comparison device 264 compares a pattern including the state value given according to the channel with a pattern per event illustrated in the judgment table.

A judgment table illustrated by example in FIG. 10B is configured in such a manner that the pattern per event corresponds to display information related to the specific channel as information indicating the channel Information on, for example, the type or name of the observed value, the name of a field device related to the observed value, and a measurement point of the observed value may be used as the display information. In an example illustrated in a second column of FIG. 10B, "pattern A" includes values of "sudden increase," "sudden increase," "constant," and "constant" as state values of channels 42-1, 42-2, 42-3, and 42-N. "Pattern A" is associated with a channel related to "temperature 1" as the display information. In an example illustrated in a third column of FIG. 10B, "pattern B" includes values of "constant," "sudden decrease," "sudden increase," and "constant" as the state values of channels 42-1, 42-2, 42-3, and 42-N. "Pattern B" is associated with a channel related to "flow rate 1" as the display information.

The comparison device 264 compares each of M patterns illustrated by the judgment table with the pattern illustrated in FIG. 10A. The comparison device 264 specifies "pattern M" matching the pattern illustrated in FIG. 10A, and a channel related to "pressure 5" associated with "pattern M." The notification output device 265 then transmits notification channel information indicating "pressure 5" to the terminal apparatus 10. Notification information indicating "pressure 5" is displayed on the display device 16 of the terminal apparatus 10. Here, the data processing device 14 of the terminal apparatus 10 may output graph data to the display device 16. The graph data may superimpose and represent a character string indicating "pressure 5" at a position corresponding to a relevant measurement point in the plant facility 60, on the above-mentioned configuration diagram. Moreover, the data processing device 14 may output, to the display device 16, graph data representing a graphic indicating a portion of the measurement point in a display form different from a graphic indicating another portion.

The comparison device 264 does not necessarily compare state values of all channels included in each pattern when comparing the pattern read from the change trend holding device 262 with the pattern per event illustrated in the judgment table stored in the judgment table storage device 263. In other words, the comparison device 264 may compare only state values of a predetermined part of the channels. When the state values of all the channels as the comparison targets agree with each other, it may be determined that both patterns match. Channels through which upon the occurrence of an event related to the pattern, an observed value significantly different in the change trend is acquired in comparison with a case where the event does not occur may be used as the channels of the comparison targets. In this case, the other channels may not be used. The channels of the comparison targets can be generally different according to the events.

(Notification Process)

Next, an example of a notification process according to one or more embodiments of the present invention is described.

Figure 11:
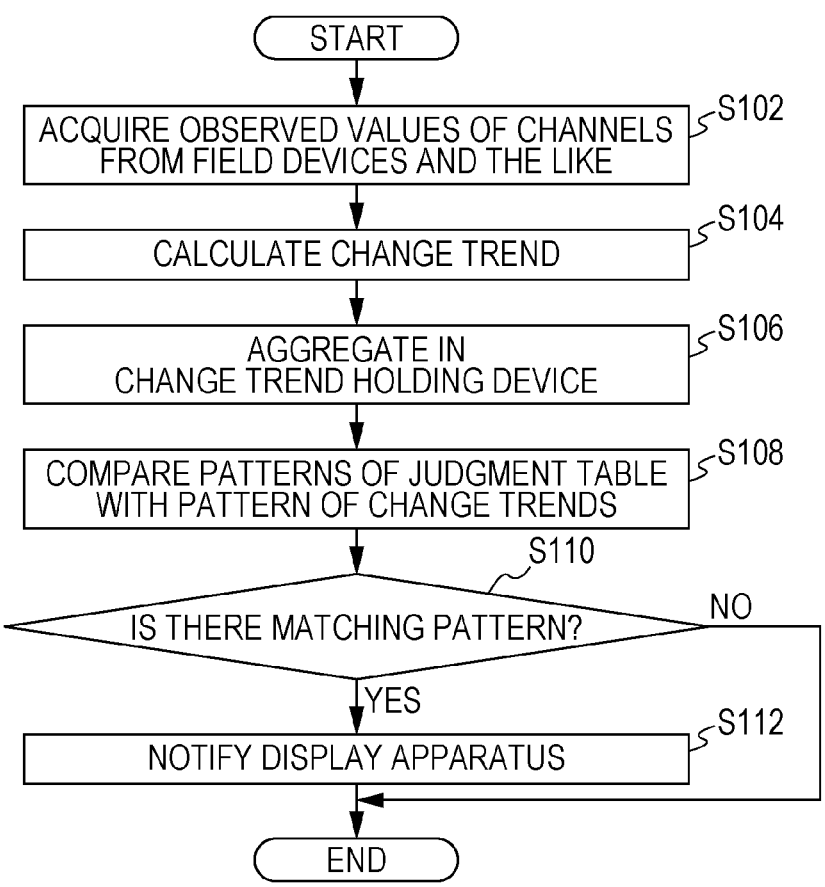
FIG. 11 is a flowchart illustrating an example of a notification process according to one or more embodiments of the present invention.

FIG. 11 is a flowchart illustrating an example of the notification process according to one or more embodiments of the present invention.

(Step S102) The data acquisition devices 32 and 42 of the I/O modules 30 and 41 acquire time-series data indicating an observed value at each point in time according to the channel. The observed values per channel may include a state quantity indicating each of the states of the I/O modules 30 and 41, in addition to an input value inputted from each of the field devices 62. The notification process then proceeds to a process of step S104.

(Step S104) The change trend determination devices 34 and 44 of the I/O modules 30 and 41 calculate a slope indicating an observed value change trend per channel. The change trend determination devices 34 and 44 output change trend data indicating the calculated slope to the control apparatus 20. The notification process then proceeds to a process of step S106.

(Step S106) The change trend data acquisition device 261 of the control apparatus 20 acquires the change trend data per channel, aggregates the state value per channel in the change trend holding device 262, and further forms a pattern of the state values from channel to channel. The notification process then proceeds to a process of step S108.

(Step S108) The comparison device 264 compares the patterns of the state values from channel to channel according to the events illustrated in the judgment table with the pattern of the state values from channel to channel held in the change trend holding device 262. The notification process then proceeds to a process of step S110.

(Step S110) The comparison device 264 determines whether or not a pattern matching the pattern of the state values from channel to channel held in the change trend holding device 262 is present in the patterns illustrated in the judgment table. If it has been determined that the matching pattern is present (Step S110 YES), the comparison device 264 determines a specific channel corresponding to the matching pattern, and proceeds to a process of step S112. If it has been determined that the matching pattern is not present (step S110 NO), the process illustrated in FIG. 11 ends.

(Step S112) The notification output device 265 transmits (notifies) notification channel information indicating the specific channel to the terminal apparatus 10 via the communication device 24 (FIG. 5). The process illustrated in FIG. 11 then ends.

When it is determined whether or not both patterns agree with each other, a plurality of patterns that are determined, by the comparison device 264 that has compared the state values of a part of the channels, to agree may be specified.

Hence, as illustrated by example in FIG. 10B, each pattern may be further associated with information on a priority level in the judgment table. In this example, a level value of any of predetermined three level values "H", "M", and "L" is set as the information on the priority level. It is illustrated that among the three levels, the priority level "H" is the highest, and the propriety level "L" is the lowest. A higher priority level is preset as the priority level for a pattern corresponding to a more important event. Moreover, if a certain event is an event that becomes a cause of another event, a priority level corresponding to a pattern corresponding to the event that becomes the cause may be set higher than a priority level corresponding to a pattern corresponding to the other event. "H" is set as the value of the priority level corresponding to "pattern A" in the second column of FIG. 10B.

When there is a plurality of specified patterns, the comparison device 264 refers to the judgment table, and selects a pattern with the highest priority level corresponding to any of the specified patterns. When patterns corresponding to the patterns read from the change trend holding device 262 are "pattern A" and "pattern M," the comparison device 264 selects "pattern A" corresponding to the priority level "H" being a priority level equal to or greater than the predetermined priority level threshold "M" from the priority levels "H" and "L" corresponding to "pattern A" and "pattern M." The comparison device 264 then selects the channels of "temperature 1" as channels related to display data corresponding to the selected patterns.

The comparison device 264 may select a predetermined number of patterns, or a number less than the predetermined number of patterns, in the descending order of the priority levels corresponding to the specified pattern, and select channels corresponding to the selected patterns.

Figure 12:
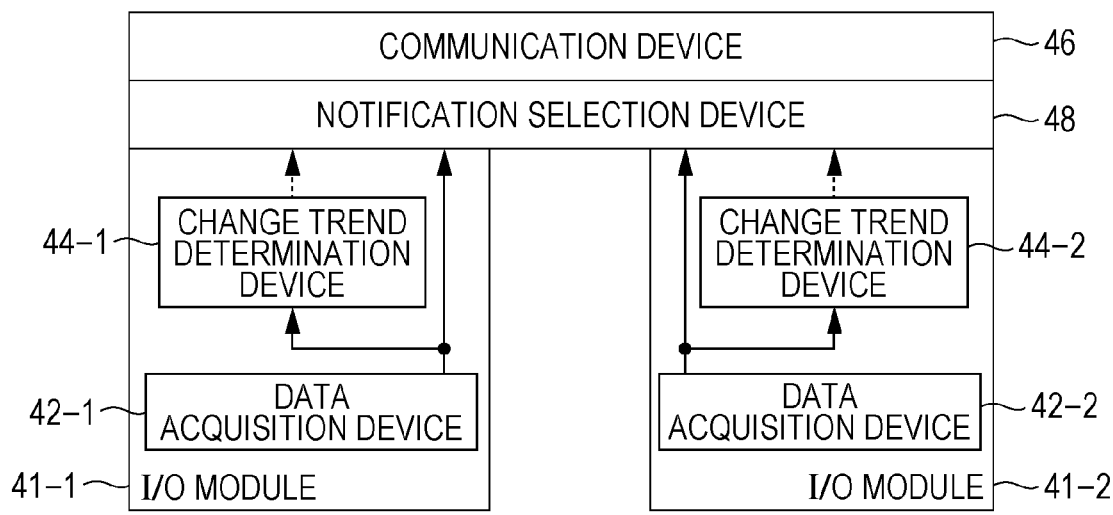
FIG. 12 is a block diagram illustrating an example of the configuration of a remote I/O node according to a modification of one or more embodiments of the present invention.

In the above description, the case where the control apparatus 20 includes the notification selection device 26 is illustrated by example. However, the form of the notification selection device 26 is not limited to this example. A function device corresponding to the notification selection device 26 may be included in a device that can acquire sets of time-series data and change trend data of a plurality of channels, and transmit at least a part of these sets. For example, as illustrated in FIG. 12, the remote I/O node 40 may further include a notification selection device 48. The functional configuration of the notification selection device 48 is similar to that of the notification selection device 26 of the control apparatus 20. The notification selection device 48 performs the above-mentioned processes, and selects time-series data and change trend data of at least a part of channels from time-series data of each channel inputted from the data acquisition device 42 and change trend data of the corresponding channels inputted from the change trend determination device 44. The notification selection device 48 transmits the selected time-series data and change trend data to an upper device via the communication device 46. In the example illustrated in FIG. 5, the upper device being a transmission destination is the control apparatus 20.

The control system 3 may further include a gateway apparatus (not illustrated). The gateway apparatus includes a notification selection device having a similar functional configuration to the notification selection device 26. Here, a communication device of the gateway apparatus receives time-series data and change trend data per channel by wired or wireless connection from the remote I/O node 40 placed in a lower layer. The notification selection device performs the above-mentioned process and selects at least a part of the time-series data and change trend data received by the communication device. The notification selection device then transmits the selected time-series data and change trend data by wireless or wired connection to the upper device via the communication device. In this case, the notification selection device 48 may be omitted in the remote I/O node 40 placed in the lower layer.

As described above, the acquisition device acquires time-series data of a plurality of channels in the electronic device (for example, the control apparatus 20 or the remote I/O node 40) according to one or more embodiments of the present invention. The acquisition device includes the notification selection device (for example, the notification selection device 26 or 48) that selects a channel for notifying information on a channel on the basis of a change trend per channel.

According to this configuration, a user who observes many pieces of time-series data is notified of the information on the channel selected on the basis of the change trend. In other words, the channel being a notification target is limited to a channel related to time-series data indicating a significant change trend in observed values. In this manner, a channel related to time-series data having a gentle change trend is omitted to reduce the frequency of notification. Hence, the working load related to monitoring on the user is reduced. For example, it is possible to notify information on a specific channel to maintenance personnel, as the user, who usually does not keep watching the display screen. The channel can be selected on the basis of a change trend in time series in self-diagnostic information of a field device or the like. The maintenance personnel can grasp, at a glance, information indicating the sign of an abnormality as the information to be notified. Hence, it is possible to make a judgment about the necessity of work related to maintenance and perform the necessary work quickly. Moreover, it is possible to reduce the amount of communication related to notification, the load of data processing in the terminal apparatus 10, and its amount of electric power. Furthermore, it becomes possible to narrow targets to simulate typical process control for detecting a change trend down to only important points, which in turn solves the working load related for modeling for the simulation.

Moreover, the notification selection device includes the storage device (for example, the judgment table storage device 263) and the notification output device (for example, the notification output device 265). The judgment table where patterns indicating change trends per channel are associated with specific channels is previously stored in the storage device. Moreover, the notification output device refers to the judgment table to select a pattern matching a change trend in the observed values indicated by time-series data per channel acquired by the acquisition device. In this manner, the notification output device (for example, the notification output device 265) that selects a specific channel associated with the pattern is included.

According to this configuration, a pattern is previously provided for each event of an abnormality or a sign thereof. Accordingly, a pattern matching a change trend in the observed values indicated by time-series data per channel is specified. Information on a channel corresponding to the specified pattern is selected. Hence, the user who observes time-series data can reliably grasp an event of an abnormality or a sign thereof, the event being related to the selected information, without depending on the user's experience and knowledge. Moreover, the user can focus his/her attention on the channel related to the event. Accordingly, the monitoring load can be reduced.

Moreover, a priority level is assigned to a pattern in the judgment table. When there is a plurality of patterns selected, as the priority level assigned to the patterns is increased, the notification output device gives a higher priority to and outputs information on a specific channel associated with the pattern.

According to the configuration, when a plurality of events occurs at once, information on a channel related to an event with a high priority level is selected. Hence, the user who observes time-series data can monitor or judge an engineering priority level related to the channel without depending on the user's experience and knowledge.

As described above, the embodiments of the present invention have been described with reference to the drawings. However, the specific configuration is not limited to these embodiments. Various design changes and the like can be made within the scope that does not depart from the gist of the embodiments of the present invention.

For example, the numbers of the terminal apparatuses 10, the control apparatuses 20, the I/O modules 30 and 41, the remote I/O nodes 40, and the field devices 62 in the control systems 1, 2, and 3 are not limited to the above-mentioned numbers. Their numbers may be greater or less than the above-mentioned numbers. The number of sets of time-series data and change trend data acquired by the notification selection device 26 or 48, that is, the number of channels, is simply required to be two or more. Time-series data of channels that are targeted for selection by the notification selection device 26 or 48 is not necessarily limited to time-series data including, as an observed value, a measurement value measured by the field device 62. The time-series data may include, as the observed value, a state quantity indicating the state of each of the I/O modules 30 and 41 and the field device 62.

In the above-mentioned embodiments, the case where the control apparatus 20 relays time-series data and change trend data, which are transmitted to the terminal apparatus 10, is illustrated by example. However, embodiments of the present invention are not limited to the above-mentioned embodiments. For example, the I/O module 30 or 41 may transmit time-series data and change trend data to the terminal apparatus 10 via the communication device 24 of the control apparatus 20. Moreover, the notification selection device 48 of the remote I/O node 40 may transmit time-series data and change trend data to the terminal apparatus 10, not via the control apparatus 20.

Moreover, in the example illustrated in FIG. 3, the case where the terminal apparatus 10 includes the display device 16 and the operation input device 18 is illustrated by example. However, the form of the terminal apparatus 10 is not limited to the example of FIG. 3. A part or both of the display device 16 and the operation input device 18 may not be included in the terminal apparatus 10 as long as they can transmit and receive data to and from other portions of the terminal apparatus 10.

The process control system according to one or more embodiments of the present invention may be configured in such a manner that a part of the terminal apparatus 10, the control apparatus 20, the I/O modules 30 and 41, and the remote I/O node 40 according to the above-mentioned embodiments is realized by a computer. In this case, the control function may be realized in such a manner that a program for achieving the control function is recorded in a computer-readable recording medium, the recorded program is read into a computer system, and the read program is executed by a computation processing circuit such as a CPU. Accordingly, the control function may be achieved. The "computer system" here is a computer system embedded in the terminal apparatus 10, the control apparatus 20, the I/O module 30 or 41, or the remote I/O node 40. An OS and hardware such as a peripheral device are also included in the computer system. Moreover, examples of the "computer-readable recording medium" include storage devices such as portable media including a flexible disk, a magneto-optical disk, a ROM, and a CD-ROM, and a hard disk built in the computer system. Furthermore, the "computer-readable recording medium" also includes: a recording medium that holds the program dynamically in short time, such as a communication line that transmits the program via a communication line such as a network, for example, the Internet, and a telephone line; and a recording medium that holds the program for a fixed period of time, such as volatile memory in a server, or the computer system acting as a client in this case. Moreover, the program may be a program for achieving a part of the above-mentioned functions. Furthermore, the above-mentioned functions may be achieved in a combination with the program that has already been recorded in the computer system. Moreover, the above-mentioned computer system may be configured as a computing resource being a constituent element of a cloud computing system. The use of the cloud computing system enables the transmission and receipt of various pieces of data via a network.

Moreover, a part or all of the terminal apparatus 10, the control apparatus 20, the I/O modules 30 and 41, and the remote I/O node 40 in the above-mentioned embodiments may be realized as an integrated circuit such as LSI (large scale integration). Each functional block of the terminal apparatus 10, the control apparatus 20, the I/O modules 30 and 41, and the remote I/O node 40 may be made as a processor. Moreover, a part or all of the functional blocks may be integrated into the processor. Moreover, a method for integrating circuits is not limited to LSI. An integrated circuit may be realized by a dedicated circuit or general-purpose processor. Moreover, if a technology for the integration of circuits as an alternative to LSI appears with the progress of the semiconductor technology, an integrated circuit by the technology may be used.

The process control system according to one or more embodiments of the present invention may be the following first to tenth process control systems:

The first process control system is a process control system including: one or a plurality of field devices provided in a plant; and a control apparatus configured to perform at least one of input and output on the field device to control the plant, and includes a change trend calculation device provided to at least one of change trend calculation targets of the field devices to calculate a change trend in time-series data indicating an observed value at each point in time.

The second process control system is the first process control system characterized in that the change trend calculation device connects the field device and the control apparatus, and is provided to at least an input device into which an output of the field device is inputted.

The third process control system is the first process control system characterized in that the change trend calculation device is provided to the field device.

The fourth process control system is the first process control system characterized in that the change trend calculation device is provided to a relay apparatus that relays an observed value to be transmitted from the field device to the control apparatus.

The fifth process control system is any of the first to fourth process control systems in which the change trend calculation device extracts time-series data indicating an observed value at each point in time within an analysis range from a first point in time to a second point in time, and calculates a slope of a linear function indicating a change trend in the observed values within the analysis range in such a manner as to minimize an objective function, the objective function is the sum of multiplied values at the points in time within the analysis range, the multiplied value is a numerical value obtained by multiplying a square value of a difference between a function value of the linear function and the observed value by a weight coefficient, and the weight coefficient is a numerical value that becomes higher with increasing elapsed time from the first point in time to each point in time.

The sixth process control system is any of the first to fifth process control systems including a notification selection device configured to select a channel for notifying information on a channel on the basis of the change trend per channel.

The seventh process control system is the sixth process control system in which the notification selection device includes: a storage device configured to previously store a judgment table where a pattern indicating the change trend per channel is associated with a specific channel; and a notification output device configured to refer to the judgment table, select a pattern matching change trends in the observed values indicated by time-series data per channel, and select a specific channel associated with the pattern.

The eighth process control system is the seventh process control system in which the judgment table is one where a priority level is assigned to the pattern, and when there is a plurality of patterns selected, the notification output device gives a higher priority to and outputs information on the specific channel associated with the pattern as the priority level assigned to the pattern is increased.

The ninth process control system is any of the sixth to eighth process control systems in which the notification selection device calculates expected time from the current point in time to a point in time when an observed value of a channel exceeds a predetermined threshold on the basis of the change trend per channel, and selects a channel for notifying information on the channel on the basis of the expected time per channel.

The tenth process control system is any of the first to ninth process control systems including a management apparatus configured to display the time-series data or the change trend.

The data processing method according to one or more embodiments of the present invention may be a data processing method in a process control system including one or a plurality of field devices provided in a plant, and a control apparatus configured to perform at least one of input and output on the field device to control the plant, and include the steps of being provided to at least one of change trend calculation targets of the field devices and calculating a change trend in time-series data indicating an observed value at each point in time. The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A process control system comprising:
field devices placed in a plant;
a control apparatus that outputs data to and/or receives data from the field devices to control the plant;
channels, each of which connects a respective one of the field devices with the control apparatus; and
I/O modules each comprising a processor that:
calculates a slope of a linear function indicating a change trend per channel in time-series data of observed values, wherein each of the observed values includes an input value indicating a state of the plant, and each of the field devices obtains the observed values at one or more points in time,
determines, based on the slope, a state value per channel indicating the change trend of a latest observed value among the observed values, and
outputs the calculated slope and the determined state value to the control apparatus, wherein
the control apparatus further:
calculates expected time from a latest point in time to a point in time when any of the observed values exceeds a predetermined threshold by calculating a difference between the predetermined threshold and the latest observed value and dividing the difference by the slope of the latest observed value,
selects, from among the channels, a channel based on whether the expected time per channel exceeds a time threshold, and outputs the state value of the selected channel to an external apparatus.

2. The process control system according to claim 1, wherein
each of the I/O modules receives an output from the respective one of the field devices, and connects the respective one of the field devices with the control apparatus.

3. The process control system according to claim 1, wherein each of the I/O modules is disposed in the respective one of the field devices.

4. The process control system according to claim 1, wherein at least one of the I/O modules is disposed in a relay apparatus that relays the observed values transmitted from the one of the field devices to the control apparatus.

5. The process control system according to claim 1, wherein
each of the I/O modules:
extracts the time-series data at each of the points in time within an analysis range from a first point in time to a second point in time, and
calculates the slope within the analysis range so as to minimize an objective function,
the objective function is a sum of multiplied values at the points in time within the analysis range,
each of the multiplied values is a numerical value obtained by multiplying a square value of a difference between a function value of the linear function and each of the observed values by a weight coefficient, and
the weight coefficient is a numerical value that becomes higher with increasing elapsed time from the first point in time to each of the points in time.

6. The process control system according to claim 1, wherein
the control apparatus:
comprises a storage device that stores a judgment table of patterns, each of which indicates the change trends of the channels and is associated with a specific channel;
selects, from among the patterns, a pattern matching predetermined change trends;
selects, from among the channels, a specific channel associated with the selected pattern with reference to the judgment table; and
outputs information on the selected specific channel to the external apparatus.

7. The process control system according to claim 6, wherein
the judgment table includes the patterns to which priority levels are assigned, and
upon selecting two or more of the patterns, the control apparatus gives a higher priority to and outputs information on the specific channel associated with the pattern as the priority level assigned to the pattern is increased.

8. The process control system according to claim 1, further comprising a management apparatus that displays the time-series data or the change trend.

9. The process control system according to claim 1, wherein the state value indicates one of a sudden increase, gentle increase, constant, gentle decrease or sudden decrease of the change trend indicated by the calculated slope.

10. The process control system according to claim 1, wherein
the control apparatus:
when the expected time is equal to or less than the time threshold, determines that the state value of the channel is required to be output, and
when the expected time is greater than the time threshold, determines that the state value of the channel is not required to be output.

11. A data processing method of a process control system comprising field devices placed in a plant, a control apparatus that outputs data to and/or receives data from the field devices to control the plant, channels that each connect a respective one of the field devices with the control apparatus, and I/O modules each comprising a processor, the method comprising:
outputting and/or receiving data to and/or from the field devices to control the plant;
calculating a slope of a linear function indicating a change trend per channel in time-series data of observed values, wherein each of the observed values includes an input value indicating a state of the plant, and each of the field devices obtains the observed values at one or more points in time;
determining, based on the slope, a state value per channel indicating the change trend of a latest observed value among the observed values;
outputting the calculated slope and the determined state value to the control apparatus;
calculating expected time from a latest point in time to a point in time when any of the observed values exceeds a predetermined threshold by calculating a difference between the predetermined threshold and the latest observed value and dividing the difference by the slope of the latest observed value;
selecting, from among the channels, a channel based on whether the expected time per channel exceeds a time threshold; and
outputting the state value of the selected channel to an external apparatus.

12. The process control method according to claim 11, wherein the state value indicates one of a sudden increase, gentle increase, constant, gentle decrease or sudden decrease of the change trend indicated by the calculated slope.

* * * * *